(12) United States Patent
Kim et al.

(10) Patent No.: US 12,118,669 B2
(45) Date of Patent: Oct. 15, 2024

(54) SUBDIVIDING A THREE-DIMENSIONAL MESH UTILIZING A NEURAL NETWORK

(71) Applicant: Adobe Inc., San Jose, CA (US)

(72) Inventors: Vladimir Kim, Seattle, WA (US); Siddhartha Chaudhuri, Bangalore (IN); Noam Aigerman, San Francisco, CA (US); Hsueh-ti Liu, Toronto (CA); Alec Jacobson, Toronto (CA)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/821,704

(22) Filed: Aug. 23, 2022

(65) Prior Publication Data

US 2023/0267686 A1    Aug. 24, 2023

Related U.S. Application Data

(63) Continuation of application No. 16/863,189, filed on Apr. 30, 2020, now Pat. No. 11,423,617.

(51) Int. Cl.
| | | |
|---|---|---|
| *G06T 17/20* | (2006.01) | |
| *G06N 3/02* | (2006.01) | |
| *G06N 3/08* | (2023.01) | |
| *G06T 7/13* | (2017.01) | |

(52) U.S. Cl.
CPC .............. *G06T 17/20* (2013.01); *G06N 3/02* (2013.01); *G06N 3/08* (2013.01); *G06T 7/13* (2017.01); *G06T 2207/20081* (2013.01)

(58) Field of Classification Search
CPC .............. G06T 7/13; G06T 17/20; G06N 3/02
See application file for complete search history.

(56) References Cited

U.S. PATENT DOCUMENTS

| | | |
|---|---|---|
| 2017/0032560 A1 | 2/2017 | Dionne et al. |
| 2018/0012407 A1 | 1/2018 | Chuang et al. |
| 2019/0035140 A1 | 1/2019 | Fricke et al. |

(Continued)

OTHER PUBLICATIONS

Noam Aigerman, Roi Poranne, and Yaron Lipman. 2014. Lifted bijections for low distortion surface mappings. ACM Transactions on Graphics (TOG) 33, 4 (2014), 69.

(Continued)

*Primary Examiner* — Matthew Salvucci
(74) *Attorney, Agent, or Firm* — Keller Preece PLLC

(57) ABSTRACT

Methods, systems, and non-transitory computer readable storage media are disclosed for utilizing one or more neural networks to recursively subdivide a three-dimensional mesh according to local geometries of vertices in the three-dimensional mesh. For example, the disclosed system can determine a local geometry (e.g., a one-ring neighborhood of half-flaps) for each vertex in a three-dimensional mesh. For each subdivision iteration, the disclosed system can then utilize a neural network to determine displacement coordinates for existing vertices in the three-dimensional mesh and coordinates for new vertices added to edges between the existing vertices in the three-dimensional mesh in accordance with the local geometries of the existing vertices. Furthermore, the disclosed system can generate a subdivided three-dimensional mesh based on the determined displacement coordinates for the existing vertices and the determined coordinates for the new vertices.

20 Claims, 15 Drawing Sheets

(56) References Cited

U.S. PATENT DOCUMENTS

| | | | | |
|---|---|---|---|---|
| 2019/0340803 | A1* | 11/2019 | Comer | G06T 13/40 |
| 2020/0043228 | A1 | 2/2020 | Patrick et al. | |
| 2020/0265552 | A1 | 8/2020 | Hemmer et al. | |
| 2021/0103638 | A1* | 4/2021 | Bussmann | G06N 20/00 |

OTHER PUBLICATIONS

Noam Aigerman, Roi Poranne, and Yaron Lipman. 2015. Seamless surface mappings. ACM Transactions on Graphics (TOG) 34, 4 (2015), 72.

Harry G Barrow, Jay M Tenenbaum, Robert C Bolles, and Helen C Wolf. 1977. Parametric correspondence and chamfer matching: Two new techniques for image matching. Technical Report. SRI International Menlo Park CA Artificial Intelligence Center.

Alexander I Bobenko, Helmut Pottmann, and Thilo Rörig. 2019. Multi-Nets. Classification of discrete and smooth surfaces with characteristic properties on arbitrary parameter rectangles. Discrete & Computational Geometry (2019), 1-32.

Alexander M Bronstein, Michael M Bronstein, and Ron Kimmel. 2008. Numerical geometry of non-rigid shapes. Springer Science & Business Media.

Michael M. Bronstein, Joan Bruna, Yann LeCun, Arthur Szlam, and Pierre Vandergheynst. 2016. Geometric deep learning: going beyond Euclidean data. CoRR abs/1611.08097 (2016). arXiv:1611.08097 http://arxiv.org/abs/1611.08097.

Edwin Catmull and James Clark. 1978. Recursively generated B-spline surfaces on arbitrary topological meshes. Computer-aided design 10, 6 (1978), 350-355.

Siddhartha Chaudhuri, Daniel Ritchie, Jiajun Wu, Kai Xu, and Hao (Richard) Zhang. 2020. Learning to Generate 3D Structures. In Eurographics State-of-the-Art Report (STAR).

Paolo Cignoni, Claudio Rocchini, and Roberto Scopigno. 1998. Metro: measuring error on simplified surfaces. In Computer graphics forum, vol. 17. Wiley Online Library, 167-174.

J. Cohen, D. Manocha, and M. Olano. 1997. Simplifying polygonal models using successive mappings. In Proceedings. Visualization '97 (Cat. No. 97CB36155). 395-402. https://doi.org/10.1109/VISUAL.1997.663908.

Jonathan Cohen, Marc Olano, and Dinesh Manocha. 1998. Appearance-preserving simplification. In Proceedings of the 25th annual conference on Computer graphics and interactive techniques. Citeseer, 115-122.

Angela Dai and Matthias Nießner. 2019. Scan2Mesh: From Unstructured Range Scans to 3D Meshes. In Proc. Computer Vision and Pattern Recognition (CVPR), IEEE.

Tony DeRose, Michael Kass, and Tien Truong. 1998. Subdivision surfaces in character animation. In Proceedings of the 25th annual conference on Computer graphics and interactive techniques. Citeseer, 85-94.

Tamal K Dey, Herbert Edelsbrunner, Sumanta Guha, and Dmitry V Nekhayev. 1999. Topology preserving edge contraction. Publ. Inst. Math.(Beograd)(NS) 66, 80 (1999), 23-45.

D Doo. 1978. A subdivision algorithm for smoothing down irregularly shaped polyhedrons.

Daniel Doo and Malcolm Sabin. 1978. Behaviour of recursive division surfaces near extraordinary points. Computer-Aided Design 10, 6 (1978), 356-360.

Nira Dyn, David Levine, and John A Gregory. 1990. A butterfly subdivision scheme for surface interpolation with tension control. ACM transactions on Graphics (TOG) 9, 2 (1990), 160-169.

Haoqiang Fan, Hao Su, and Leonidas J Guibas. 2017. A point set generation network for 3d object reconstruction from a single image. In Proceedings of the IEEE conference on computer vision and pattern recognition. 605-613.

Michael S Floater and Charles A Micchelli. 1997. Nonlinear stationary subdivision. Citeseer.

Michael Garland and Paul S Heckbert. 1997. Surface simplification using quadric error metrics. In Proceedings of the 24th annual conference on Computer graphics and interactive techniques. ACM Press/Addison-Wesley Publishing Co., 209-216.

Thibault Groueix, Matthew Fisher, Vladimir G. Kim, Bryan C. Russell, and Mathieu Aubry. 2018a. 3D-Coded : 3D Correspondences by Deep Deformation. ECCV (2018).

Thibault Groueix, Matthew Fisher, Vladimir G. Kim, Bryan C. Russell, and Mathieu Aubry. 2018b. AtlasNet: A Papier-Mâché Approach to Learning 3D Surface Generation. CVPR (2018).

Rana Hanocka, Amir Hertz, Noa Fish, Raja Giryes, Shachar Fleishman, and Daniel Cohen-Or. 2019. MeshCNN: A Network with an Edge. ACM Transactions on Graphics (TOG) 38, 4 (2019), 90.

Hugues Hoppe, Tony DeRose, Tom Duchamp, Mark Halstead, Hubert Jin, John McDonald, Jean Schweitzer, and Werner Stuetzle. 1994. Piecewise smooth surface reconstruction. In Proceedings of the 21st annual conference on Computer graphics and interactive techniques. ACM, 295-302.

Krishna Murthy J., Edward Smith, Jean-Francois Lafleche, Clement Fuji Tsang, Artem Rozantsev, Wenzheng Chen, Tommy Xiang, Rev Lebaredian, and Sanja Fidler. 2019. Kaolin: A PyTorch Library for Accelerating 3D Deep Learning Research. arXiv:1911.05063 (2019).

Kęstutis Karčiauskas and Jörg Peters. 2018. A new class of guided C2 subdivision surfaces combining good shape with nested refinement. In Computer Graphics Forum, vol. 37. Wiley Online Library, 84-95.

Ladislav Kavan, Dan Gerszewski, Adam W. Bargteil, and Peter-Pike Sloan. 2011. Physics-Inspired Upsampling for Cloth Simulation in Games. ACM Trans. Graph. 30, 4, Article Article 93 (Jul. 2011), 10 pages. https://doi.org/10.1145/2010324.1964988.

Michael Kazhdan and Hugues Hoppe. 2013. Screened poisson surface reconstruction. ACM Transactions on Graphics (TOG) 32, 3 (2013), 29.

Diederik P Kingma and Jimmy Ba. 2014. Adam: A method for stochastic optimization. arXiv preprint arXiv:1412.6980 (2014).

Leif Kobbelt. 1996. Interpolatory subdivision on open quadrilateral nets with arbitrary topology. In Computer Graphics Forum, vol. 15. Wiley Online Library, 409-420.

Leif Kobbelt. 2000. 3-subdivision. In Proc. SIGGRAPH. 103-112.

Ilya Kostrikov, Zhongshi Jiang, Daniele Panozzo, Denis Zorin, and Joan Bruna. 2018. Surface Networks. In Proc. Computer Vision and Pattern Recognition (CVPR), IEEE.

Vladislav Kraevoy and Alla Sheffer. 2004. Cross-parameterization and compatible remeshing of 3D models. ACM Transactions on Graphics (TOG) 23, 3 (2004), 861-869.

Aaron WF Lee, Wim Sweldens, Peter Schröder, Lawrence C Cowsar, and David P Dobkin. 1998. MAPS: Multiresolution adaptive parameterization of surfaces. In Siggraph, vol. 98. 95-104.

Ruihui Li, Xianzhi Li, Chi-Wing Fu, Daniel Cohen-Or, and Pheng-Ann Heng. 2019. PU-GAN: a Point Cloud Upsampling Adversarial Network. ICCV.

Songrun Liu, Zachary Ferguson, Alec Jacobson, and Yotam Gingold. 2017. Seamless: Seam erasure and seam-aware decoupling of shape from mesh resolution. ACM Transactions on Graphics (TOG) 36, 6, Article 216 (Nov. 2017), 15 pages. https://doi.org/10.1145/3130800.3130897.

Yang Liu, Helmut Pottmann, Johannes Wallner, Yong-Liang Yang, and Wenping Wang. 2006. Geometric modeling with conical meshes and developable surfaces. In ACM transactions on graphics (TOG), vol. 25. ACM, 681-689.

Charles Loop. 1987. Smooth subdivision surfaces based on triangles. Master's thesis, University of Utah, Department of Mathematics (1987).

Haggai Maron, Meirav Galun, Noam Aigerman, Miri Trope, Nadav Dym, Ersin Yumer, Vladimir G. Kim, and Yaron Lipman. 2017. Convolutional Neural Networks on Surfaces via Seamless Toric Covers. SIGGRAPH (2017).

Jonathan Masci, Davide Boscaini, Michael M. Bronstein, and Pierre Vandergheynst. 2015. Geodesic convolutional neural networks on Riemannian manifolds. In Proc. of the IEEE International Conference on Computer Vision (ICCV) Workshops. 37-45.

Patrick Mullen, Yiying Tong, Pierre Alliez, and Mathieu Desbrun. 2008. Spectral conformal parameterization. In Computer Graphics Forum, vol. 27. Wiley Online Library, 1487-1494.

(56) References Cited

OTHER PUBLICATIONS

Vinod Nair and Geoffrey E Hinton. 2010. Rectified linear units improve restricted boltzmann machines. In Proceedings of the 27th international conference on machine learning (ICML-10). 807-814.
Adam Paszke, Sam Gross, Soumith Chintala, Gregory Chanan, Edward Yang, Zachary DeVito, Zeming Lin, Alban Desmaison, Luca Antiga, and Adam Lerer. 2017. Automatic differentiation in PyTorch. (2017).
Adrien Poulenard and Maks Ovsjanikov. 2018. Multi-directional Geodesic Neural Networks via Equivariant Convolution. In SIGGRAPH Asia.
Emil Praun, Wim Sweldens, and Peter Schröder. 2001. Consistent Mesh Parameterizations. In Proceedings of the 28th Annual Conference on Computer Graphics and Interactive Techniques (SIGGRAPH '01). Association for Computing Machinery, NewYork, Ny, USA, 179-184. https://doi.org/10.1145/383259.383277.
Reinhold Preiner, Tamy Boubekeur, and Michael Wimmer. 2019. Gaussian-Product Subdivision Surfaces. In SIGGRAPH 2019.
Michael Rabinovich, Tim Hoffmann, and Olga Sorkine-Hornung. 2018. The shape space of discrete orthogonal geodesic nets. In SIGGRAPH Asia 2018 Technical Papers. ACM, 228.
Inam Ur Rahman, Iddo Drori, Victoria C Stodden, David L Donoho, and Peter Schröder. 2005. Multiscale representations for manifold-valued data. Multiscale Modeling & Simulation 4, 4 (2005), 1201-1232.
Anurag Ranjan, Timo Bolkart, Soubhik Sanyal, and Michael J. Black. 2018. Generating 3D faces using Convolutional Mesh Autoencoders. In ECCV.
Malcolm A Sabin and Neil A Dodgson. 2004. A circle-preserving variant of the four-point subdivision scheme. Mathematical Methods for Curves and Surfaces: Tromsø (2004), 275-286.
Scott Schaefer, Etienne Vouga, and Ron Goldman. 2008. Nonlinear subdivision through nonlinear averaging. Computer Aided Geometric Design 25, 3 (2008), 162-180.
John Schreiner, Arul Asirvatham, Emil Praun, and Hugues Hoppe. 2004. Inter-Surface Mapping. ACM Trans. Graph. 23, 3 (Aug. 2004), 870-877. https://doi.org/10.1145/1015706.1015812.
V. Sitzmann, J. Thies, F. Heide, M. Nießner, G. Wetzstein, and Zollhöfer. 2019. Deep Voxels: Learning Persistent 3D Feature Embeddings. In Proc. Computer Vision and Pattern Recognition (CVPR), IEEE.
Olga Sorkine. 2005. Laplacian mesh processing. In Eurographics (STARs). 53-70.
Jos Stam. 1998. Exact Evaluation of Catmull-Clark Subdivision Surfaces at Arbitrary Parameter Values. In Proc. SIGGRAPH. 395-404.
Qingyang Tan, Lin Gao, Yu-Kun Lai, and Shihong Xia. 2018. Variational Autoencoders for Deforming 3D Mesh Models. In Conference on Computer Vision and Pattern Recognition (CVPR).
Chengcheng Tang, Xiang Sun, Alexandra Gomes, Johannes Wallner, and Helmut Pottmann. 2014. Form-Finding with Polyhedral Meshes Made Simple. ACM Trans. Graph. 33, 4, Article Article 70 (Jul. 2014), 9 pages. https://doi.org/10.1145/2601097. 2601213.
Maxim Tatarchenko, Stephan R. Richter, René Ranftl, Zhuwen Li, Vladlen Koltun, and Thomas Brox. 2019. What Do Single-view 3D Reconstruction Networks Learn? CVPR.
Robert F. Tobler, Stefan Maierhofer, and Alexander Wilkie. 2002a. Mesh-Based Parametrized L-Systems and Generalized Subdivision for Generating Complex Geometry. International Journal of Shape Modeling 8, 2 (2002), 173-191.

Robert F. Tobler, Stefan Maierhofer, and Alexander Wilkie. 2002b. A Multiresolution Mesh Generation Approach for Procedural Definition of Complex Geometry. In Proc. SMI.
Oliver Van Kaick, Hao Zhang, Ghassan Hamarneh, and Daniel Cohen-Or. 2011. A survey on shape correspondence. In Computer Graphics Forum, vol. 30. Wiley Online Library, 1681-1707.
Amir Vaxman, Christian Müller, and Ofir Weber. 2018. Canonical Möbius subdivision.In SIGGRAPH Asia 2018 Technical Papers. ACM, 227.
Luiz Velho, Ken Perlin, Henning Biermann, and Lexing Ying. 2002. Algorithmic shape modeling with subdivision surfaces. Computers & Graphics 26, 6 (2002), 865-875.
Matthias Vestner, Roee Litman, Emanuele Rodolà, Alex Bronstein, and Daniel Cremers. 2017. Product manifold filter: Non-rigid shape correspondence via kernel density estimation in the product space. In Proceedings of the IEEE Conference on Computer Vision and Pattern Recognition. 3327-3336.
N. Wang, Y. Zhang, Z. Li, Y. Fu, W. Liu, and Y. Jiang. 2018. Pixel2Mesh: Generating 3D Mesh Models from Single RGB Images. In ECCV.
Yu Wang, Vladimir G. Kim, Michael Bronstein, and Justin Solomon. 2019. Learning Geometric Operators on Meshes. ICLR Workshop on Representation Learning on Graphs and Manifolds (2019).
C. Wen, Y. Zhang, Z. Li, and Y. Fu. 2019. Pixel2Mesh++: Multi-View 3D Mesh Generation via Deformation. In ICCV.
Wang Yifan, Noam Aigerman, Vladimir G. Kim, Siddhartha Chaudhuri, and Olga Sorkine-Hornung. 2019a. Neural Cages for Detail-Preserving 3D Deformations. arXiv:cs.GR/1912.06395.
Wang Yifan, Shihao Wu, Hui Huang, Daniel Cohen-Or, and Olga Sorkine-Hornung. 2019b. Patch-Based Progressive 3D Point Set Upsampling. In The IEEE Conference on Computer Vision and Pattern Recognition (CVPR).
Lequan Yu, Xianzhi Li, Chi-Wing Fu, and Daniel Cohen-Orand Pheng-Ann Heng. 2018. PU-Net: Point Cloud Upsampling Network. In CVPR.
Denis Zorin. 2007. Subdivision on arbitrary meshes: algorithms and theory. In Mathematics and Computation in Imaging Science and Information Processing. World Scientific, 1-46.
Denis Zorin, Peter Schröder, T De Rose, L Kobbelt, A Levin, and W Sweldens. 2000. Subdivision for modeling and animation. SIGGRAPH Course Notes (2000).
Denis Zorin, Peter Schröder, and Wim Sweldens. 1996. Interpolating Subdivision for Meshes of Arbitary Topology. (1996).
U.S. Appl. No. 16/863,099, filed May 5, 2021, Preinterview 1st Office Action.
U.S. Appl. No. 16/863,099, filed Jun. 18, 2021, Office Action.
U.S. Appl. No. 16/863,099, filed Oct. 20, 2021, Notice of Allowance.
U.S. Appl. No. 16/863,189, filed Jul. 15, 2021, Office Action.
U.S. Appl. No. 16/863,189, filed Oct. 21, 2021, Office Action.
U.S. Appl. No. 16/863,189, filed Apr. 20, 2022, Notice of Allowance.
Kėstutis Karčiauskas and Jörg Peters. 2018. A new class of guided C2 subdivision surfaces combining good shape with nested refinement. In Computer Graphics Forum, vol. 37. Wiley Online Library, 84-95.
Matthias Vestner, Roce Litman, Emanuele Rodolà, Alex Bronstein, and Daniel Cremers. 2017. Product manifold filter: Non-rigid shape correspondence via kernel density estimation in the product space. In Proceedings of the IEEE Conference on Computer Vision and Pattern Recognition. 3327-3336.

\* cited by examiner

SUBDIVIDING A THREE-DIMENSIONAL MESH UTILIZING A NEURAL NETWORK

CROSS-REFERENCE TO RELATED APPLICATIONS

The present application is a continuation of U.S. application Ser. No. 16/863,189, filed on Apr. 30, 2020. The aforementioned application is hereby incorporated by reference in its entirety.

BACKGROUND

Improvements to computer processing technologies have led to significant advancements in the field of digital three-dimensional modeling. For example, computer processing speeds and resources have provided many different types of systems the ability to generate and render three-dimensional models in a variety of computing and other environments. For example, systems use three-dimensional models in digital media for entertainment (e.g., movies, TV shows, video), advertising media in digital and print environments, augmented/virtual reality environments, and medical imaging devices.

Generating and rendering three-dimensional models with high levels of detail, however, can be a difficult and resource-expensive task. Specifically, three-dimensional models typically include meshes with vertices that define polygonal faces with textures applied to the surfaces of the models. Increasing the number of vertices can increase the amount of detail possible in a three-dimensional model, but it also increases the amount of processing power and time required to render the three-dimensional model (e.g., when applying textures and lighting to the model) as a final product. Accordingly, many conventional digital modeling systems provide tools for three-dimensional modeling users to create or edit coarse meshes (e.g., meshes with fewer vertices, and therefore, less detail) and then subdivide the meshes prior to final rendering. In other words, the systems up-samples the resolution of the meshes by increasing the number of vertices and amount of detail in the meshes.

Some conventional digital modeling systems subdivide meshes by first adding vertices to the mesh and then smoothing the positions of the vertices by taking a linear, weighted average of their neighbors' positions. More specifically, the conventional systems smooth the positions of the vertices according to a weighted scheme that is based on the local mesh connectivity. By smoothing meshes based on local mesh connectivity, these conventional systems can introduce inaccuracies in the meshes by overly smoothing details in the meshes, particularly when performing more than one subdivision. Such conventional systems typically require users to manually adjust the subdivided mesh vertices, and repeat the subdivision/adjustment process until obtaining the desired level of detail. Thus, in addition to producing inaccurate meshes when performing more than one subdivision, the conventional systems also require a significant amount of time and manual user refinement.

SUMMARY

One or more embodiments provide benefits and/or solve one or more of the foregoing or other problems in the art with systems, methods, and non-transitory computer readable storage media that utilize one or more neural networks to subdivide a three-dimensional mesh according to a geometry-dependent, non-linear subdivision scheme based on local geometries of the three-dimensional mesh. To illustrate, the disclosed systems can determine a local geometry (e.g., a local neighborhood of half-flaps—referring to a directed edge, and the pair of triangles adjacent to the directed edge) for each vertex of a plurality of existing vertices in a three-dimensional mesh. The disclosed systems can then utilize a neural network to subdivide the three-dimensional mesh by processing the local geometries of the existing vertices to determine displacement coordinates for the existing vertices. The disclosed systems then also adds new vertices to the mesh at edges between the existing vertices and utilize the neural network to determine coordinates for the new vertices. Furthermore, the disclosed systems can generate a subdivided three-dimensional mesh according to the displacement coordinates for the existing vertices and the coordinates for the new vertices. In this manner, the disclosed systems can subdivide a three-dimensional mesh to up-sample the number of vertices in the mesh while retaining information about the local geometries (e.g., geometry details) of the three-dimensional mesh in the subdivided mesh.

Additional features and advantages of one or more embodiments of the present disclosure will be set forth in the description below.

BRIEF DESCRIPTION OF THE DRAWINGS

Various embodiments will be described and explained with additional specificity and detail through the use of the accompanying drawings in which.

DETAILED DESCRIPTION

Figure 1:
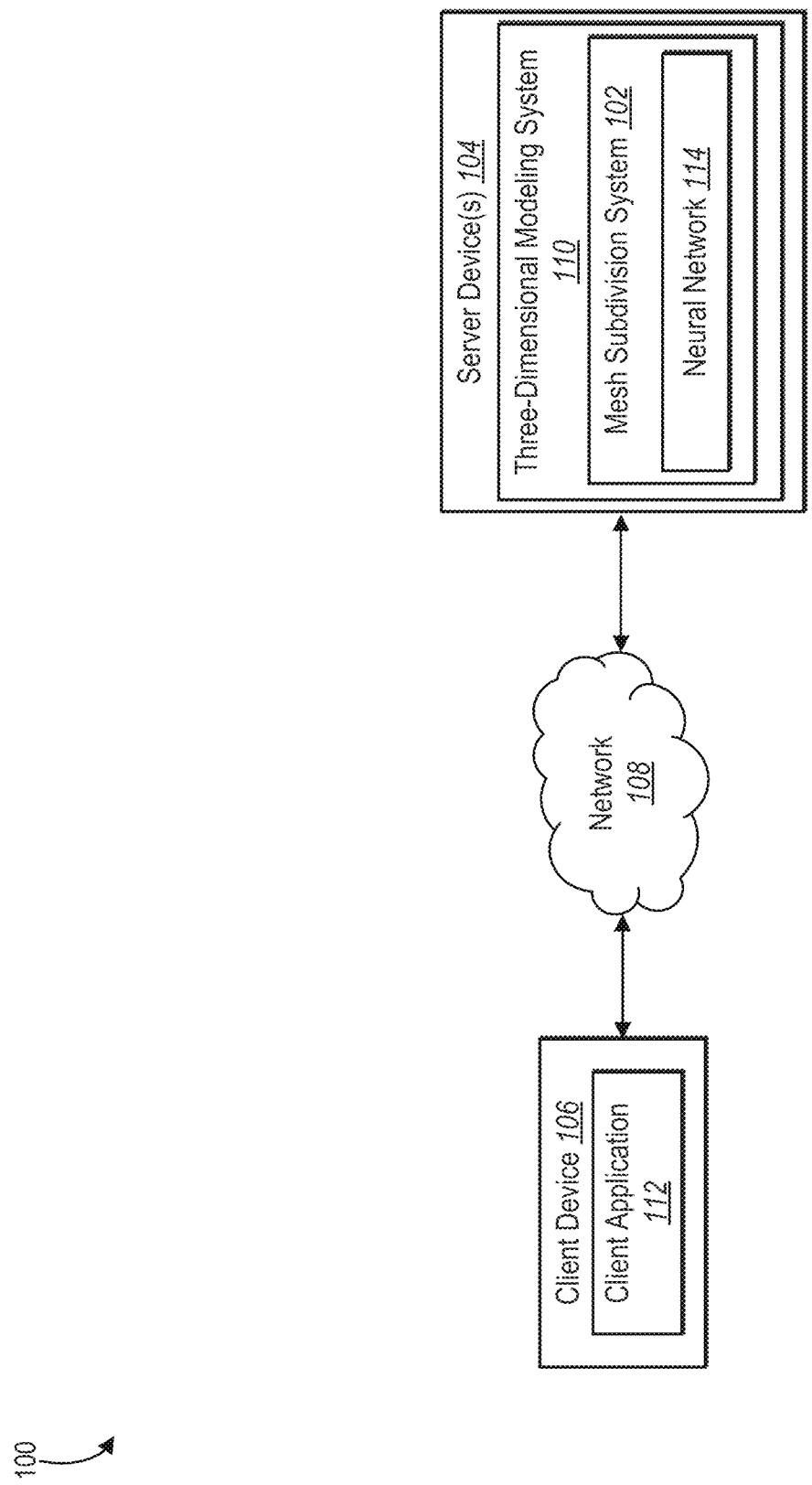
FIG. 1 illustrates an example system environment in which a mesh subdivision system can operate in accordance with one or more implementations.

One or more embodiments of the present disclosure include a mesh subdivision system that utilizes one or more neural networks to perform recursive subdivision of a three-dimensional mesh based on local geometries of vertices in the three-dimensional mesh. In particular, the mesh subdivision system can determine local geometries of vertices in a three-dimensional mesh (e.g., a three-dimensional triangle mesh) according to neighboring vertices and edges. For example, the mesh subdivision system can utilize one or more neural networks to determine positions for vertices in the mesh at each subdivision level by conditioning the neural network(s) on the local geometry of each vertex to incorporate the local geometry data into the vertex positions. The mesh subdivision system can then generate a subdivided three-dimensional mesh including the existing vertices and new vertices at the determined vertex positions. Accordingly, the mesh subdivision system can accurately and flexibly generate three-dimensional meshes of varying levels of subdivision including local geometry information and without requiring manual input and refinement by a user at each subdivision level. Furthermore, the mesh subdivision system can accurately produce subdivided three-dimensional meshes without being constrained to a fixed genus (e.g., shape/style of object), relying on a template, or requiring a large training dataset.

As mentioned, the mesh subdivision system can determine local geometries of vertices within a three-dimensional mesh. In one or more embodiments, the mesh subdivision system determines local geometries for a three-dimensional triangle mesh in which the vertices form triangular faces along a surface of the mesh. The mesh subdivision system can identify a local geometry for a vertex based on a local neighborhood of vertices surrounding the vertex. To illustrate, the mesh subdivision system can determine the local geometry for a vertex based on a 1-ring neighborhood of vertices connected to the vertex via edges within the mesh. By identifying the local geometry of each vertex in the mesh according to surrounding vertices, the mesh subdivision system can incorporate local geometric context of a surface when subdividing the mesh.

To subdivide the three-dimensional mesh, the mesh subdivision system can utilize one or more neural network to process the mesh according to the local geometries of the vertices. Specifically, in one or more embodiments, the mesh subdivision system can utilize a plurality of neural networks (e.g., separate neural network modules) to process the local geometries. More specifically, the mesh subdivision system generates feature vectors to implicitly guide the neural network(s) to choose the positioning of the vertices at a given subdivision iteration. For instance, the mesh subdivision system can utilize a first neural network to perform an initialization that processes half-flaps of the mesh surface corresponding the vertices to generate feature vectors stored at the vertices, with each vertex holding one feature vector.

After the initialization process, and for each subdivision iteration, the mesh subdivision system can utilize a second neural network to update the positions of the existing vertices (i.e., vertices at the corners of surface polygons at a previous mesh level). In particular, the mesh subdivision system determines, utilizing the second neural network, both new feature vectors and new positions for each existing vertex, based on the previous feature vectors and position that vertex's 1-ring vertices had. The mesh subdivision system can also utilize a third neural network to determined features of vertices added to edges between the existing vertices from the previous mesh level. For instance, the mesh subdivision system can determine, utilizing the third neural network, positions and feature vectors of new vertices added to edges between the existing vertices according to the local geometries.

Once the mesh subdivision system has determined the updated coordinates of the existing vertices and coordinates for new vertices, the mesh subdivision system can generate a subdivided three-dimensional mesh. In one or more embodiments, in response to a request to subdivide a three-dimensional mesh, the mesh subdivision system can generate an updated mesh that includes updated coordinates for the vertices in the mesh. Additionally, the updated mesh can also include vertices added to edges between the existing vertices at the determined coordinates. Accordingly, the mesh subdivision system can generate a finer mesh from a coarse mesh while incorporating information about the local geometries of the vertices into the updated mesh.

The disclosed mesh subdivision system can provide a number of advantages over conventional systems. For example, the mesh subdivision system can improve the accuracy relative to conventional systems that subdivide three-dimensional models. To illustrate, while some conventional systems utilize linear, weighted averages to subdivide three-dimensional meshes, the mesh subdivision system can more accurately generate subdivided three-dimensional meshes by utilizing neural networks trained on a small number of possibly dissimilar training samples to subdivide the meshes according to local geometries of vertices. Indeed, by determining positions of existing and new vertices in a subdivided three-dimensional mesh according to learned subdivision rules based local geometries of the vertices while ensuring rotation and translation invariances, the mesh subdivision system can leverage its learned knowledge of local geometry and more accurately retain details of the mesh and avoid overly smoothing the mesh across a plurality of subdivision operations.

Furthermore, the mesh subdivision system can more efficiently subdivide three-dimensional meshes relative to conventional systems. Specifically, some conventional systems may require users to manually adjust vertex positions to avoid overly smoothing fine details of three-dimensional meshes. In contrast, the mesh subdivision system can automatically generate subdivided three-dimensional meshes by utilizing neural networks to perform a plurality of subdivision iterations based on existing details in the three-dimensional meshes without requiring any manual feature refinement of vertices to avoid overly smoothing fine details of three-dimensional meshes.

The mesh subdivision system can also improve the flexibility of computing devices that subdivide three-dimensional meshes. For example, by utilizing neural networks to subdivide three-dimensional meshes according to local geometries of vertices, the mesh subdivision system can apply a number of different effects to the subdivided meshes. More specifically, the mesh subdivision system can create different variations of neural networks for subdividing that apply different stylistic effects by learning parameters of the neural network variants using meshes with different stylistic properties.

As illustrated by the foregoing discussion, the present disclosure utilizes a variety of terms to describe features and advantages of the mesh subdivision system. Additional detail is now provided regarding the meaning of such terms. For example, as used herein, the term "three-dimensional mesh" refers to a digital representation of an object in three dimensions. For example, a three-dimensional mesh can include a collection of vertices, edges, and faces that define the shape of the object in three dimensions. Specifically, a three-dimensional mesh can include a number of vertices (or individual points) that connect to form edges, which then define faces representing a surface of the object.

Relatedly, as used herein, the term "vertex" refers to an individual point within a three-dimensional mesh that connects to other vertices in the three-dimensional mesh to form a surface. Additionally, as used herein, the term "edge" refers to a connecting line between two vertices within a three-dimensional mesh. Furthermore, as used herein, the term "face" refers to a polygon formed by three or more edges (and therefore, three or more vertices) within a three-dimensional mesh. As an example, a three-dimensional triangle mesh includes vertices that define triangular faces representing the surface of the object. A computing device can then render a three-dimensional mesh by rendering lines for edges and/or the faces.

As used herein, the term "neural network" refers to one or more computer algorithms that can be tuned (e.g., trained) based on inputs to approximate unknown functions. In particular, a neural network can include a machine-learning model that utilizes algorithms to learn from, and make determinations on, known data by analyzing the known data to learn to generate outputs that reflect patterns and attributes of the known data. For instance, a neural network can include, but is not limited to, a multi-layer perceptron, a convolutional neural network, a recurrent neural network, a generative adversarial neural network, a variational auto-encoder, a feed forward neural network, or a graph neural network. A neural network can learn high-level abstractions in data to generate data-driven determinations, predictions, or decisions from the known input data. Furthermore, as described herein, a "neural network" can operate in conjunction with one or more other neural networks to perform different operations as part of an overall mesh subdivision process. For example, in one or more embodiments, the mesh subdivision system can utilize an initialization neural network, a vertex neural network, and an edge neural network for performing different processes associated with subdividing a three-dimensional mesh.

As used herein, the term "local geometry" refers to a coordinate frame corresponding to a particular patch of vertices within a three-dimensional mesh. Specifically, a local geometry can include a coordinate frame that corresponds to a one-ring neighborhood of vertices involving a particular vertex and a plurality of vertices connected to the particular vertex via a plurality of edges. Additionally, as used herein, the term "half-flap" can refer to a pair of polygons that share an edge. For instance, a half-flap can include a pair of triangles connected by an edge. Furthermore, a local geometry can include a coordinate frame based on a plurality of half-flaps within a one-ring neighborhood surrounding a given vertex.

As used herein, the term "displacement coordinates" refers to a set of three-dimensional coordinates corresponding to a new position of an existing vertex in a three-dimensional mesh. For example, the mesh subdivision system can utilize a neural network to determine displacement coordinates to move an existing vertex to a new position during a mesh subdivision process based on a local geometry of the existing vertex.

As used herein, the term "feature vector" refers to a set of learned features of a mesh component. For example, a feature vector can represent a learned set of features of a vertex. Additionally, a feature vector can represent a per-vertex set of features associated with a local geometry (e.g., a half-flap or a one-ring neighborhood) associated with a vertex. The features encoded by a feature vector can include patent and or latent or hidden features.

Additional detail will now be provided regarding the mesh subdivision system in relation to illustrative figures portraying exemplary implementations. To illustrate, FIG. 1 includes an embodiment of a system environment 100 in which a mesh subdivision system 102 can operate. In particular, the system environment 100 includes server device(s) 104 and a client device 106 in communication via a network 108. Moreover, as shown, the server device(s) 104 include a three-dimensional modeling system 110, which includes the mesh subdivision system 102. Additionally, the client device 106 can include a client application 112.

As shown in FIG. 1, the server device(s) 104 can include or host the three-dimensional modeling system 110. The three-dimensional modeling system 110 can include, or be part of, one or more systems that implement modeling and rendering of objects and/or scenes in a digital, three-dimensional environment. For example, the three-dimensional modeling system 110 can provide tools for viewing, generating, editing, and/or otherwise interacting with three-dimensional meshes within digital three-dimensional environments. The three-dimensional modeling system 110 can use the three-dimensional meshes in a variety of applications such as databases of three-dimensional assets, virtual or augmented reality environments, or other environments that utilize three-dimensional models. In one or more embodiments, the three-dimensional modeling system 110 can provide reconstructed three-dimensional models to another system such as a system/application at the client device 106 or a third-party system.

In connection with providing tools for interacting with three-dimensional meshes, the three-dimensional modeling system 110 can utilize the mesh subdivision system 102 to subdivide three-dimensional meshes. For example, the three-dimensional modeling system 110 can obtain a three-dimensional mesh from the client device 106 or from another system (e.g., a database of three-dimensional models). The three-dimensional modeling system 110 can then use the mesh subdivision system 102 to subdivide the three-dimensional mesh. After subdividing the three-dimensional mesh using the mesh subdivision system 102, the three-dimensional modeling system 110 can provide the subdivided mesh to the client device 106 via the network 108. By subdividing a three-dimensional mesh, the mesh subdivision system 102 can modify a coarse three-dimensional mesh by adding additional vertices in successive subdivision iterations to define smooth curves or highlight details in the mesh.

In one or more embodiments, the mesh subdivision system 102 uses one or more neural networks to subdivide three-dimensional meshes. In particular, the mesh subdivision system 102 can include a neural network(s) 114 to process a three-dimensional mesh and determine positions of existing vertices and new vertices in a subdivided version of the three-dimensional mesh. For example, the neural network(s) 114 can include one or more neural networks (e.g., individual neural networks) to perform one or more operations for determining coordinates of vertices in a subdivided three-dimensional mesh according to local geometries of the vertices in the three-dimensional mesh. The mesh subdivision system 102 can utilize the output of the neural network 114 to generate a subdivided three-dimensional mesh that incorporates the local geometry data.

As mentioned, after generating a subdivided three-dimensional mesh from a coarser three-dimensional mesh, the three-dimensional modeling system 110 can provide the subdivided three-dimensional mesh to the client device 106. In one or more embodiments, the client device 106 can display the subdivided three-dimensional mesh on a display device using the client application 112. Additionally, the client application 112 can include a digital content editing application (e.g., a three-dimensional modeling application) that provides tools for viewing, generating, editing, or otherwise interacting with three-dimensional meshes. The client device 106 can thus present a subdivided three-dimensional mesh within the client application 112 to allow a user to view, edit, or otherwise interact with the subdivided three-dimensional mesh. For instance, the client application 112 can provide tools for texturing the mesh, coloring the mesh, applying other modifiers to the mesh, or inserting the mesh into a three-dimensional environment with one or more other three-dimensional meshes or scene elements.

In one or more embodiments, the server device(s) 104 include a variety of computing devices, including those described below with reference to FIG. 12. For example, the server device(s) 104 can include one or more servers for storing and processing data associated with three-dimensional imaging applications. The server device(s) 104 can also include a plurality of computing devices in communication with each other, such as in a distributed storage environment. Furthermore, the server device(s) 104 can include devices and/or components in connection with one or more neural network(s) (e.g., the neural network 114) and training data for training the neural network(s). In some embodiments, the server device(s) 104 comprise a content server. The server device(s) 104 can also comprise an application server, a communication server, a web-hosting server, a social networking server, a digital content campaign server, or a digital communication management server.

As mentioned, the server device(s) 104 can include components associated with neural networks and training data for training one or more neural networks. In one or more embodiments, the server device(s) 104 (e.g., the mesh subdivision system 102 or another system) train the neural network 114. The server device(s) 104 can also train the neural network(s) using previously generated or labeled training data such as course and fine three-dimensional models generated for objects. In addition to utilizing one or more training datasets, the server device(s) 104 can utilize a verification dataset and a testing dataset for verifying and testing training of the neural network 114, respectively.

In addition, as shown in FIG. 1, the system environment 100 includes the client device 106. The client device 106 can include, but is not limited to, a mobile device (e.g., smartphone or tablet), a laptop, a desktop, including those explained below with reference to FIG. 12. Furthermore, although not shown in FIG. 1, the client device 106 can be operated by a user (e.g., a user included in, or associated with, the system environment 100) to perform a variety of functions. In particular, the client device 106 can perform functions such as, but not limited to, accessing, viewing, and interacting with a variety of digital content (e.g., three-dimensional imaging environments, virtual/augmented reality environments). The client device 106 can also perform functions for generating, capturing, or accessing data to provide to the three-dimensional modeling system 110 and the mesh subdivision system 102 in connection with virtual/augmented reality environments. For example, the client device 106 can communicate with the server device(s) 104 via the network 108 to provide information associated with three-meshes and three-dimensional environments. Although FIG. 1 illustrates the system environment 100 with a single client device 106, the system environment 100 can include a different number of client devices.

Additionally, as shown in FIG. 1, the system environment 100 includes the network 108. The network 108 can enable communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 may communicate via the network using a variety of communication platforms and technologies suitable for transporting data and/or communication signals, including any known communication technologies, devices, media, and protocols supportive of data communications, examples of which are described with reference to FIG. 12.

Although FIG. 1 illustrates the server device(s) 104 and the client device 106 communicating via the network 108, the various components of the mesh subdivision system 102 can communicate and/or interact via other methods (e.g., the server device(s) 104 and the client device 106 can communicate directly). Furthermore, although FIG. 1 illustrates the mesh subdivision system 102 being implemented by a particular component and/or device within the system environment 100, the mesh subdivision system 102 can be implemented, in whole or in part, by other computing devices and/or components in the system environment 100 (e.g., the client device 106). Additionally, the neural network 114 may be implemented at the server device(s) 104 or at one or more other server devices or systems.

Figure 2A:
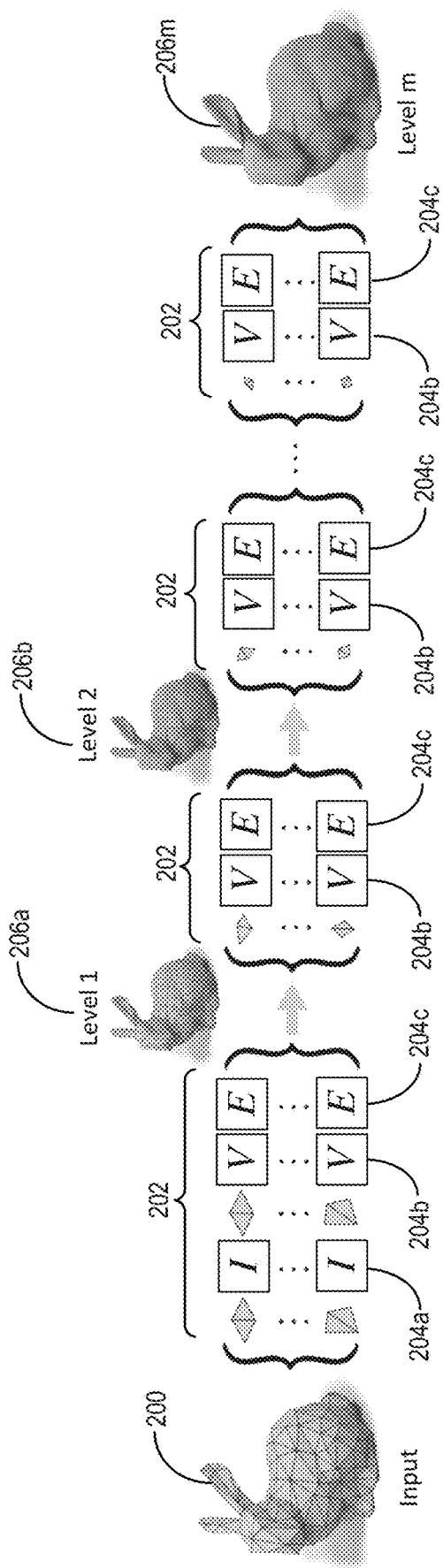
FIG. 2A illustrates a diagram of a process overview for utilizing one or more neural networks to subdivide a three-dimensional object mesh in accordance with one or more implementations.

As mentioned above, the mesh subdivision system 102 can accurately subdivide three-dimensional meshes in any number of subdivision iterations according to local geometric information in the three-dimensional meshes. FIG. 2A illustrates an overview of a process for subdividing a three-dimensional mesh using one or more neural networks. Specifically, FIG. 2A illustrates that the mesh subdivision system 102 uses local geometries of vertices in the three-dimensional mesh to determine positions of existing and new vertices. The mesh subdivision system 102 can thus generate subdivided three-dimensional meshes in any number of subdivision iterations without manual (e.g., human) intervention to adjust the mesh between each iteration.

FIG. 2A illustrates that the mesh subdivision system 102 can utilize a coarse three-dimensional mesh 200 as input to a neural network 202. In one or more embodiments, the coarse three-dimensional mesh 200 can be a three-dimensional triangle mesh that includes unrefined curves (e.g., jagged edges) due to having a limited number of vertices. For instance, a computing device (e.g., the client device 106 of FIG. 1) can generate the coarse three-dimensional mesh 200 as an initial model for quickly rendering or for reducing storage/communications resources when storing or transmitting the coarse three-dimensional mesh 200.

The mesh subdivision system 102 can perform one or more subdivision iterations in response to a request to subdivide the coarse three-dimensional mesh 200 and generate a plurality of subdivided three-dimensional meshes 206a-206m. More specifically, the mesh subdivision system 102 can perform the plurality of subdivisions to generate subdivided three-dimensional models having different levels of subdivision by using the neural network 202 at each level of subdivision. To illustrate, the mesh subdivision system 102 can use the neural network 202 to perform a first subdivision iteration to generate a first subdivided three-dimensional mesh 206a from the coarse three-dimensional mesh 200 by adding vertices to edges between existing vertices of the coarse three-dimensional mesh 200. The mesh subdivision system 102 can also use the neural network 202 to perform a second subdivision iteration to generate a second subdivided three-dimensional mesh 206b from the first subdivided three-dimensional mesh 206a by adding vertices to edges between the existing vertices of the first subdivided three-dimensional mesh 206a. The mesh subdivision system 102 can accordingly perform "m" levels of subdivision iterations to generate an m-level subdivided three-dimensional mesh 206m from an (m−1) level subdivided three-dimensional mesh. Although FIG. 2A illustrates a plurality of subdivision iterations up to m levels of subdivision, the mesh subdivision system 102 can perform as few as one or two subdivision iterations, as may serve a particular implementation.

As illustrated in FIG. 2A, the neural network 202 includes a plurality of neural networks (e.g., an initialization neural network 204a, a vertex neural network 204b, and an edge neural network 204c). As illustrated in FIG. 2A, the mesh subdivision system 102 utilizes the plurality of neural networks 204a-204m to perform an initialization step in connection with generating the first subdivided three-dimensional mesh 206a. In subsequent subdivision iterations, the mesh subdivision system 102 can utilize the vertex neural network 204b and the edge neural network 204c (without utilizing the initialization neural network 204a) to generate the subsequent subdivided three-dimensional meshes (i.e., subdivided three-dimensional meshes 206b-206m).

Figure 2B:
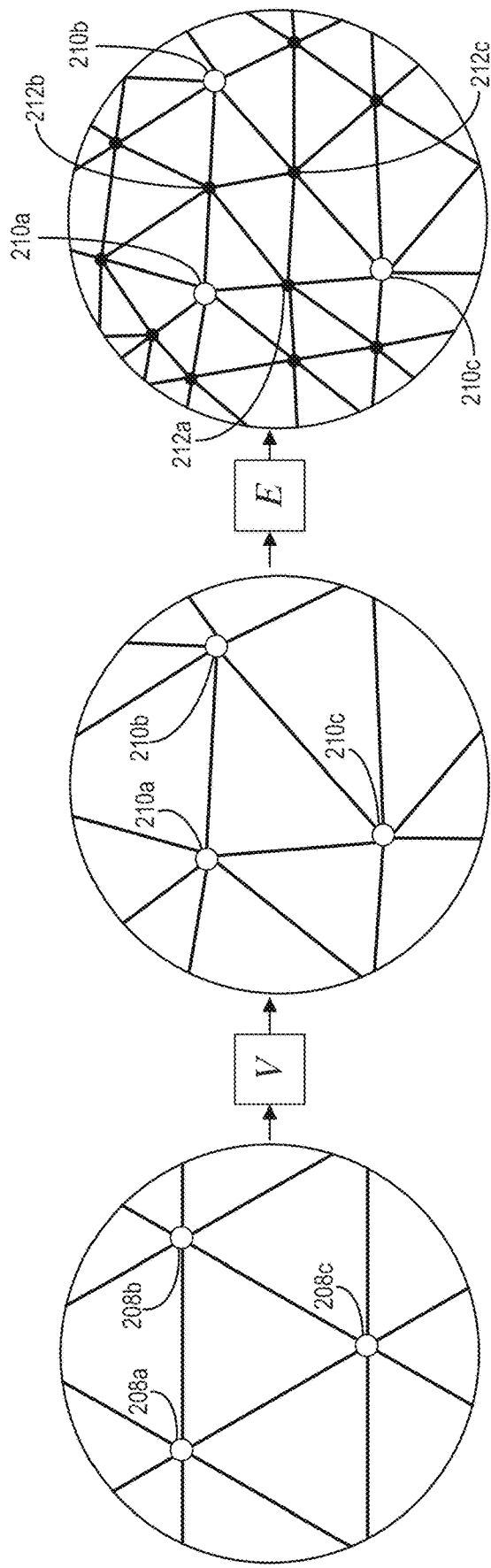
FIG. 2B illustrates a diagram of a process for utilizing a neural network to update positions of vertices in a three-dimensional mesh and subdividing the three-dimensional mesh in accordance with one or more implementations.

FIG. 2B illustrates an example of utilizing a neural network to modify positions of existing vertices in a three-dimensional mesh during subdivision of the three-dimensional mesh. Specifically, as mentioned, the mesh subdivision system 102 can utilize a neural network to process existing vertices (e.g., vertices 208a-208c) in a three-dimensional mesh to determine new positions of the vertices according to the local geometries. For example, FIG. 2B illustrates that the mesh subdivision system can process the vertices 208a-208c utilizing the vertex neural network 204b to generate updated positions of the vertices 208a-208c based on local geometries of the vertices 208a-208c. More specifically, FIG. 2B illustrates that the mesh subdivision system 102 updates the positions utilizing the vertex neural network 204b to provide updated vertices 210a-210c. In one or more embodiments, moving the positions of vertices in a three-dimensional mesh can include updating coordinates stored with the existing vertices.

Furthermore, after (or otherwise in conjunction with) updating positions of the existing vertices in a three-dimensional mesh, the mesh subdivision system 102 can subdivide the three-dimensional mesh by adding new vertices to edges between the existing vertices. For example, as illustrated in FIG. 2B, the mesh subdivision system 102 can utilize the edge neural network 204c (e.g., by applying the edge neural network 204c to the local geometries of the vertices 208a-208c) to add new vertices 212a-212c to the edges between the updated vertices 210a-210c according to local geometries in the three-dimensional mesh. To illustrate, in one or more embodiments, the mesh subdivision system 102 can first add the new vertices 212a-212c to midpoints of the edges. The mesh subdivision system 102 can then utilize the edge neural network 204c to determine the positions of the new vertices 212a-212c based on the local geometries in the three-dimensional mesh.

Figure 3:
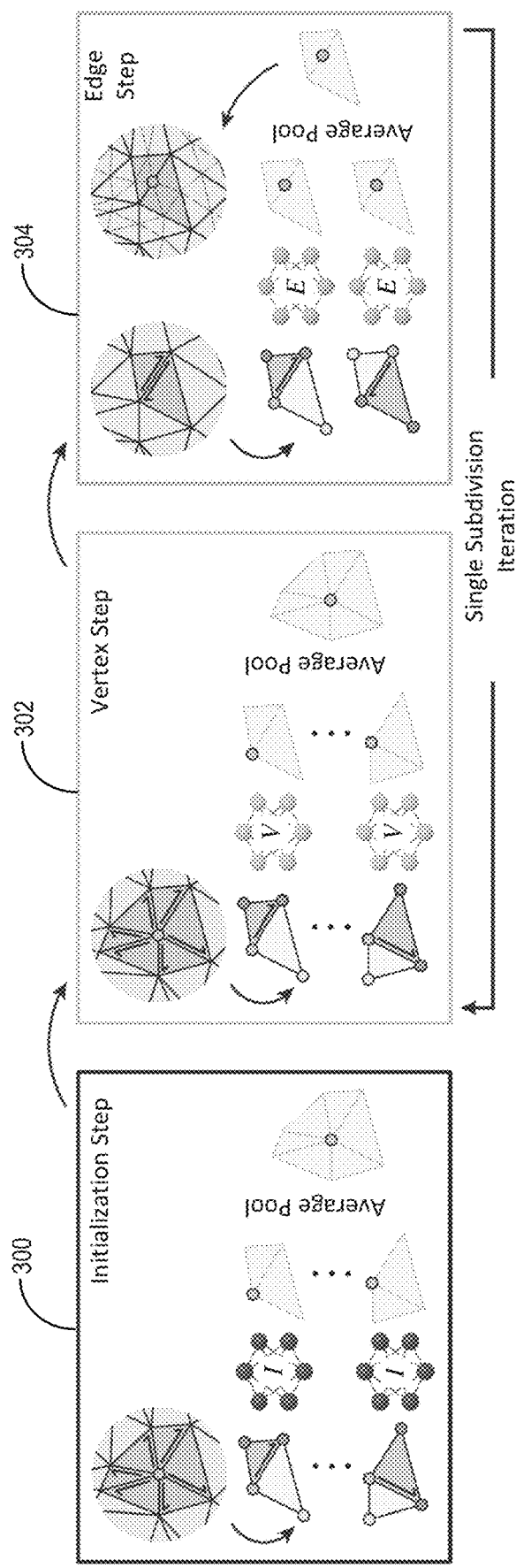
FIG. 3 illustrates a diagram of sequential neural networks for subdividing a three-dimensional mesh in accordance with one or more implementations.

As mentioned, the neural network 202 can include a plurality of neural networks for performing different operations in a mesh subdivision process. FIG. 3 illustrates a plurality of different operations in a mesh subdivision process that each utilize separate neural networks. Specifically, FIG. 3 illustrates that the subdivision process includes an initialization step 300, a vertex step 302, and an edge step 304. More specifically, a first iteration of the subdivision process includes the initialization step 300, the vertex step 302, and the edge step 304. As noted previously, subsequent iterations of the subdivision process can include the vertex step 302 and the edge step 304 while excluding the initialization step 300.

As shown in FIG. 3, the mesh subdivision system 102 recursively utilizes a neural network (e.g., the neural network 202 of FIG. 2A) to subdivide a three-dimensional mesh. For instance, in one or more embodiments, the mesh subdivision system 102 can operate over atomic local connected neighborhoods within the mesh to determine differential features. The mesh subdivision system 102 can then feed the determined differential features to the neural network to compute vertex coordinates at the new subdivision level. Thus, the mesh subdivision system 102 can utilize the neural network to determine displacement coordinates for existing vertices (e.g., new coordinates that change the positions of the existing vertices from an original position in the previous subdivision level) and coordinates for new vertices added to the three-dimensional mesh.

In one or more embodiments, the initialization step 300 involves the mesh subdivision system 102 utilizing a neural network (e.g., the initialization neural network 204a of FIG. 2A) to determine features of vertices in the three-dimensional mesh. Specifically, the mesh subdivision system 102 can first determine differential per-vertex quantities based on local coordinate frames for the vertices. The differential quantities represent the vertices with respect to a local coordinate frame instead of the global coordinates. By directly representing the local geometry for a vertex with the differential quantities, the mesh subdivision system 102 can later reconstruct the vertex coordinates when generating the subdivided three-dimensional mesh.

Once the mesh subdivision system 102 has determined the differential quantities for the vertices in a local patch corresponding to a vertex, the mesh subdivision system 102 can then utilize the neural network to map the differential quantities to feature vector stored at the vertex. To illustrate, the feature vector can be a concatenation of a learnable latent space that encodes the local geometry of the patch based on the previously determined differential quantities, and therefore, incorporates the local coordinate frame into the feature vector.

In one or more embodiments, once the mesh subdivision system 102 obtains the feature vectors representing the local patches within the three-dimensional mesh, the vertex step 302 utilizes a neural network (e.g., the vertex neural network 204b of FIG. 2A) to determine positions of existing vertices for the next level of subdivision. In particular, the mesh subdivision system 102 can determine the vertex features for each vertex based on its corresponding local neighborhood. In the vertex step 302, the mesh subdivision system 102 can determine features for the vertices forming the faces in the mesh at the previous mesh level. To illustrate, when performing a first subdivision iteration of a three-dimensional triangle mesh, the vertex step 302 involves computing features of the vertices at the corners of triangles in the input mesh. The mesh subdivision system 102 can use the features to determine displacement coordinates for modifying positions of existing vertices from the input mesh.

Furthermore, in one or more embodiments, the edge step 304 involves the mesh subdivision system 102 utilizing a neural network (e.g., the edge neural network 204c of FIG. 2A) to determine positions of new vertices added to the three-dimensional mesh. Specifically, the mesh subdivision system 102 can compute features of vertices that the mesh subdivision system 102 adds to edges of the three-dimensional mesh. For instance, in one or more embodiments, the mesh subdivision system 102 can add vertices to the edges between existing vertices from the previous (input) subdivision level. The mesh subdivision system 102 can then determine features for the added vertices that allow the mesh subdivision system 102 to determine coordinates of the new vertices.

As mentioned previously, the mesh subdivision system 102 can utilize a neural network to initialize a mesh subdivision process (e.g., in the initialization step 300) during a first subdivision iteration. As FIG. 3 further illustrates, the mesh subdivision system 102 can perform the vertex step 302 and the edge step 304 in the first subdivision iteration and in subsequent subdivision iterations. The subsequent subdivision iterations may exclude the initialization step 300, and therefore, the mesh subdivision system 102 may not use an initialization neural network to perform the initialization step 300 during the subsequent subdivision iterations.

In at least some embodiments, the neural networks (e.g., as described above with respect to FIG. 2A) that the mesh subdivision system 102 utilizes to perform the initialization step 300, the vertex step 302, and the edge step 304 can include architectures that rely on a learnable operator defined over a specified region (e.g., a flap operator for each half-flap identified based on adjacent vertices) within a local neighborhood. For example, the mesh subdivision system 102 can use the specified region to define the local coordinate frame, which the mesh subdivision system 102 uses to determine the differential features of either the input or output of the neural networks. Furthermore, the mesh subdivision system 102 can concatenate the features for each half-flap and feed the concatenated features into a corresponding half-flap operator (e.g., a shallow multi-layer perceptron) of a neural network. Additionally, each half-flap operator can have weights that are shared across all levels of subdivision for that neural network (e.g., a half-flap operator for processing a half-flap in the vertex step 302 can have shared weights other half-flap operators for that vertex step and for vertex steps across all subdivision iterations).

Figure 4A:
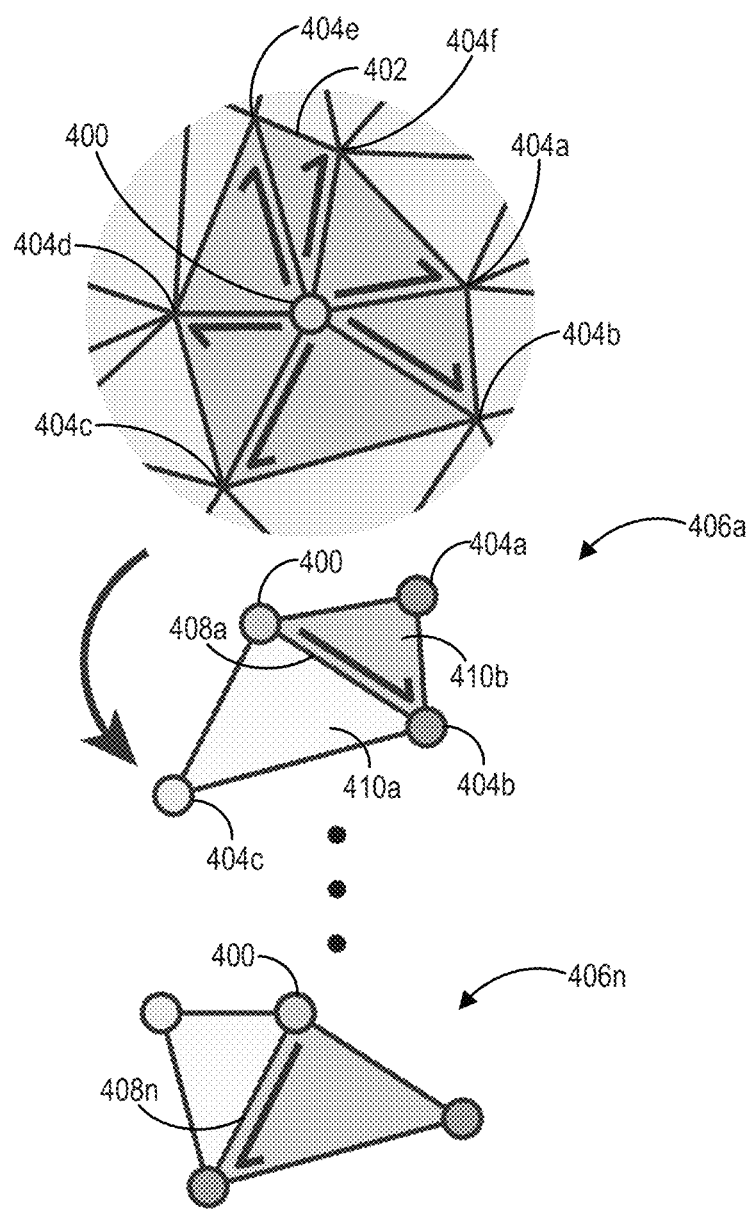
FIG. 4A illustrates a diagram of a local vertex neighborhood including a plurality of half-flaps in accordance with one or more implementations.

As mentioned above, the mesh subdivision system 102 can process vertices in a three-dimensional mesh based on local patches for the vertices. FIG. 4A illustrates that the mesh subdivision system 102 identifies local patches for the vertices in a three-dimensional mesh as one-ring neighborhoods of connected vertices. Specifically, FIG. 4A illustrates that the mesh subdivision system 102 processes a vertex 400 based on a one-ring neighborhood 402 for the vertex 400. More specifically, the one-ring neighborhood 402 includes a plurality of vertices 404a-404f directly connected to the vertex 400 via a plurality of edges in a single "ring" around the vertex 400.

In one or more embodiments, the mesh subdivision system 102 can identify a plurality of half-flaps 406a-406n from the one-ring neighborhood 402. In particular, the mesh subdivision system 102 can split the one-ring neighborhood 402 into the plurality of half flaps 406a-406n by identifying a plurality of directed edges 408a-408n from the vertex 400 to the plurality of vertices 404a-404f connected to the vertex 400. To illustrate, the mesh subdivision system 102 can identify a first half-flap 406a to include the two adjacent triangles 410a-410b of a first directed edge 408a.

Furthermore, the mesh subdivision system 102 can use the directed edges to determine a canonical order for the adjacent vertices of the half-flaps 406a-406n. To illustrate, the mesh subdivision system 102 can determine a canonical order for vertices (e.g., the vertex 400 and connected vertices 404a-404c) within the first half-flap 406a. Establishing a canonical order for vertices in the first half-flap 406a based on a directed edge can allow the mesh subdivision system 102 to generate a subdivided three-dimensional mesh with the correct position and orientation of each vertex at the corners of adjacent faces corresponding to the first half-flap 406a.

In one or more embodiments, the mesh subdivision system 102 utilizes the neural networks for the initialization step 300 and the vertex step 302 described in relation to FIG. 3 to process each half-flap by a corresponding outgoing directed edge to determine features for the half-flaps. For example, the mesh subdivision system 102 can generate a set of feature vectors that represent the half-flaps within a local neighborhood (e.g., for six directed edges that originate at the vertex 400 to the corresponding vertices 404a-404f). The mesh subdivision system 102 can then use average pooling to combine the feature vectors representing the half-flaps into a per-vertex feature vector.

Figure 4B:
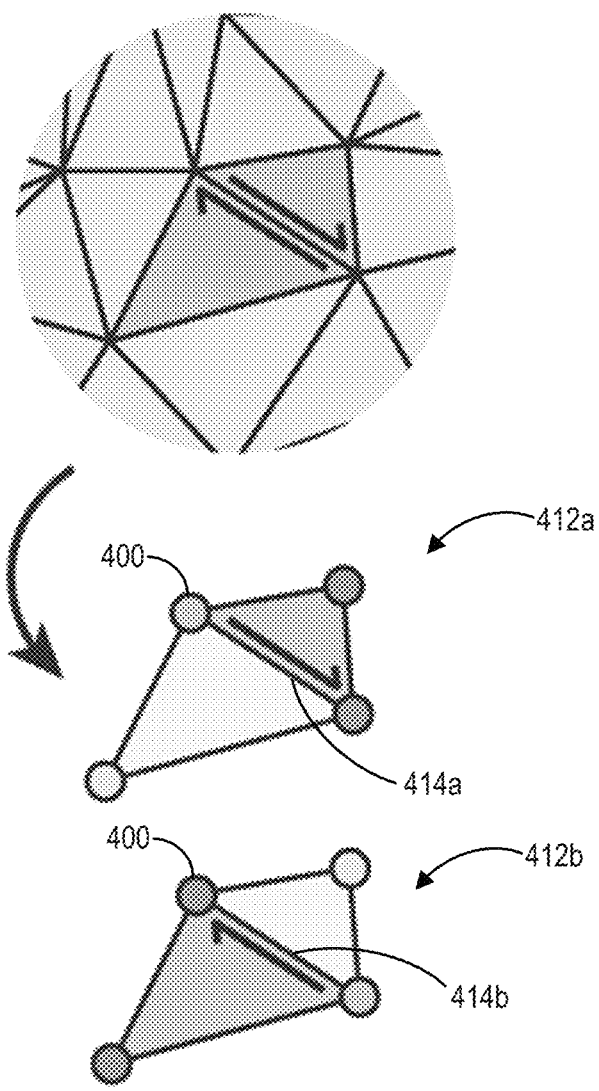
FIG. 4B illustrates a diagram of two half-flaps for both directions of an edge in accordance with one or more implementations.

Furthermore, in one or more embodiments referring back to the edge step 304 of FIG. 3, the mesh subdivision system 102 utilizes a neural network to process a pair of half-flaps for a subdivided edge. In particular, FIG. 4B illustrates that the mesh subdivision system 102 can identify two half-flaps for both directions of an edge. For example, as illustrated in FIG. 4B, a first half-flap 412a corresponds to a first directed edge 414a from the vertex 400 to a connected vertex 404b, and a second half-flap 412b corresponds to a second directed edge 414b from the connected vertex 404b and the vertex 400.

In one or more embodiments, during the edge step 304 of FIG. 3, the mesh subdivision system 102 generates feature vectors for a vertex added to the edge associated with the first half-flap 412a and the second half-flap 412b. The mesh subdivision system 102 can then combine the feature vectors from the first half-flap 412a and the second half-flap 412b to generate a single feature vector for the new vertex. For instance, the mesh subdivision system 102 can utilize average pooling to combine the feature vectors from the first half-flap 412a and the second half-flap 412b into a single feature vector. The edge step 304 can thus allow the mesh subdivision system 102 to determine features of a vertex added to the edge between the vertex 400 and the connected vertex 404b during subdivision.

Figure 5A:
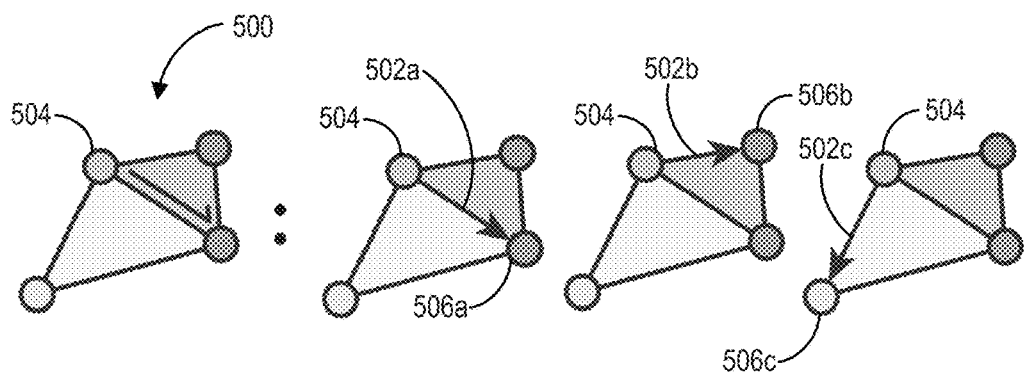
FIGS. 5A-5B illustrate edge vectors and differential coordinates in a half-flap as inputs to an initialization neural network in accordance with one or more implementations.
Figure 5B:
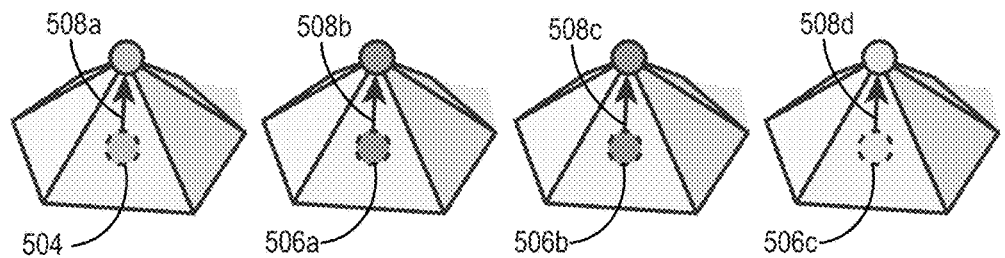
Figure 6A:
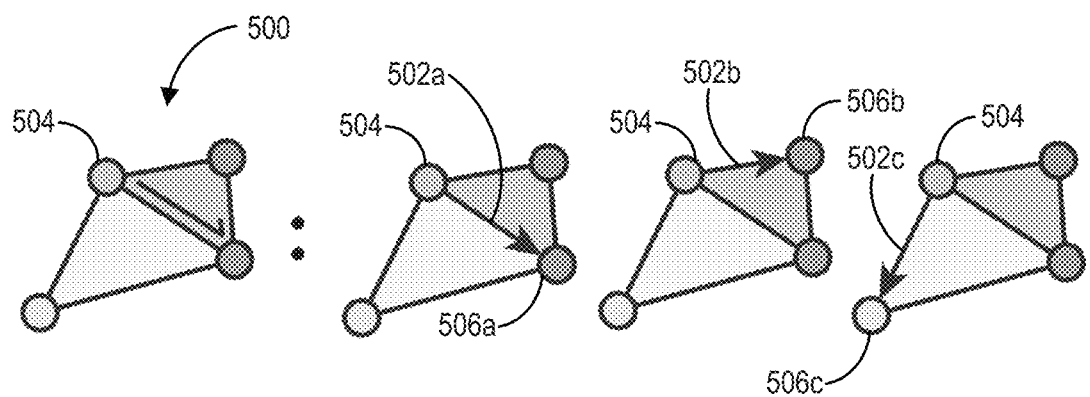
FIGS. 6A-6B illustrate edge vectors and vertex features in a half-flap as inputs to vertex and edge neural networks in accordance with one or more implementations.
Figure 6B:
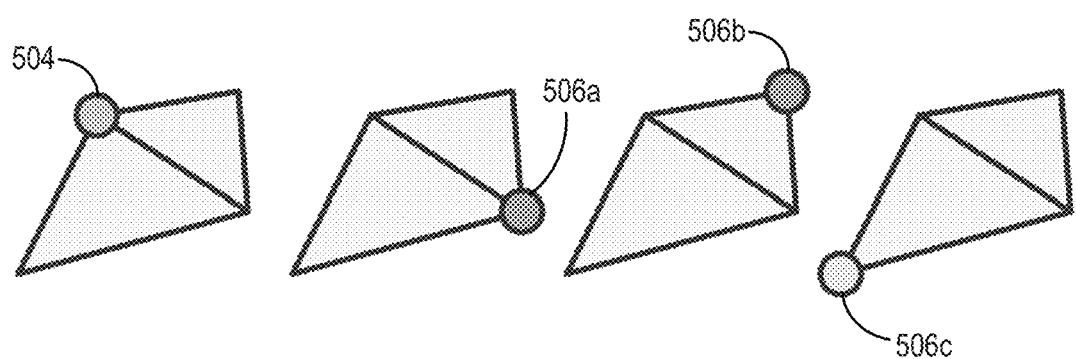
Figure 7A:
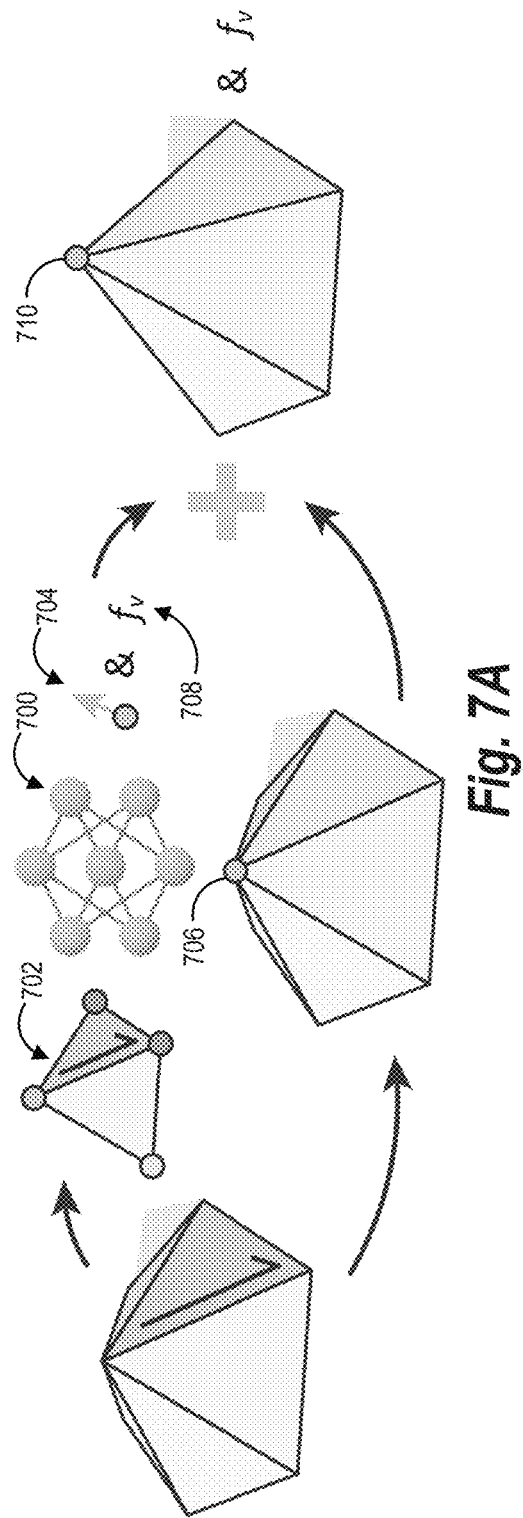
FIGS. 7A-7B illustrate displacement vectors and learned feature vectors for existing vertices and new vertices in accordance with one or more implementations.
Figure 7B:
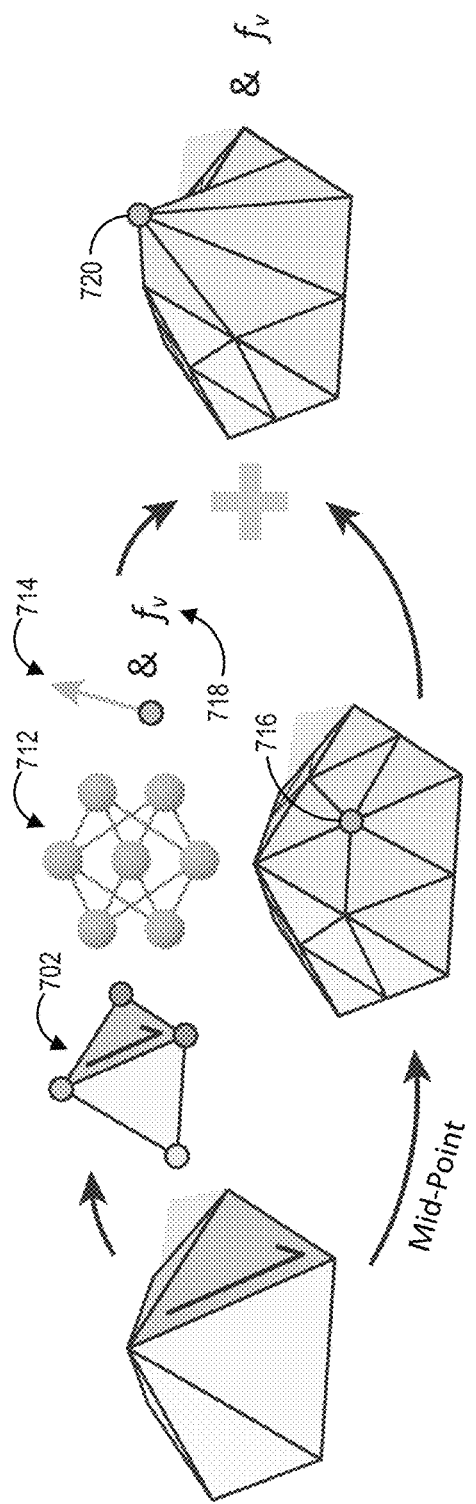

In one or more additional embodiments, the mesh subdivision system 102 utilizes inputs and outputs of the neural networks in the mesh subdivision system 102 in a way that provides invariance to rigid transformation. Specifically, FIGS. 5A-5B illustrate inputs to the initialization step 300 of FIG. 3 and FIGS. 6A-6B illustrate inputs to the vertex step 302 and edge step 304 of FIG. 3. Additionally, FIG. 7A illustrates outputs of the initialization step 300 and the vertex step 302, and FIG. 7B illustrates outputs of the edge step 304.

As illustrated in FIG. 5A, the mesh subdivision system 102 can determine, for a half-flap 500, a plurality of edge vectors 502a-502c corresponding to edges within the half-flap 500. In particular, the mesh subdivision system 102 can identify directed edges that originate at a source vertex 504 of the half-flap 500 and ends at another vertex (i.e., one of the vertices 506a-506c). Accordingly, for a half-flap 500 including two adjacent triangular faces, the mesh subdivision system 102 can determine three edge vectors—a first edge vector 502a from the source vertex 504 to a first connecting vertex 506a, a second edge vector 502b from the source vertex 504 to a second connecting vertex 506b, and a third edge vector 502c from the source vertex 504 to a third connecting vertex 506c.

FIG. 5B illustrates that the mesh subdivision system 102 can also determine differential coordinates 508a-508d for the vertices in the half-flap 500. Specifically, in one or more embodiments, the mesh subdivision system 102 determines first differential coordinates 508a for the source vertex 504, second differential coordinates 508b for the first connecting vertex 506a, third differential coordinates 508c for the second connecting vertex 506b, and fourth differential coordinates 508d for the third connecting vertex 506c. As used herein, the term "differential coordinates" refers to a vector from the absolute coordinates of a vertex to the average of the vertex's immediate neighbors in a three-dimensional mesh. Thus, the differential coordinates 508a-508d for the vertices in the half-flap 500 represent the vectors from the corresponding vertices to the averages of their respective neighbors. Furthermore, the mesh subdivision system 102 can store discrete curvature information in the differential coordinates.

Figure 5C:
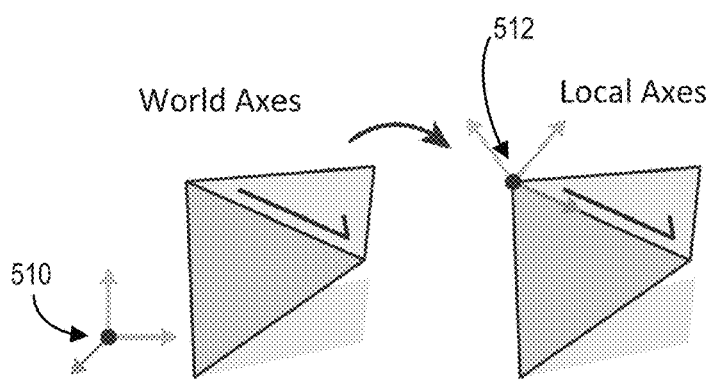
FIG. 5C illustrates a diagram for converting global axes to local axes in accordance with one or more implementations.

Additionally, by representing differential coordinates for vertices according to a local coordinate frame of a half-flap, the mesh subdivision system 102 can achieve rotation invariance in the subdivided three-dimensional mesh. FIG. 5C illustrates that the mesh subdivision system 102 can convert, for each half-flap in a three-dimensional mesh, a global coordinate frame 510 (e.g., "world axes") to a local coordinate frame 512 (e.g., "local axes"). For example, the mesh subdivision system 102 can treat each half-edge direction in the half-flap as the x-axis, the edge normal computed via averaging the two adjacent face normal as the z-axis, and the cross product of the previous two axes as the y-axis. This allows the mesh subdivision system 102 to determine a coordinate frame specific to the half-flap, resulting in determined positions of vertices within the coordinate frame specific to the half-flap during subdivision of the three-dimensional mesh, rather than determined positions of vertices with reference to the world/environment axes.

FIG. 6A illustrates that the input to the neural networks for the vertex step 302 and the edge step 304 of FIG. 3 include edge vectors. Specifically, in one or more embodiments, the mesh subdivision system 102 utilizes the same edge vectors 502a-502c as described above with respect to FIG. 5A. The first edge vector 502a corresponds to an edge from the source vertex 504 to a first connected vertex 506a, the second edge vector 502b corresponds to an edge from the source vertex 504 to a second connected vertex 506b, and the third edge vector 502c corresponds to an edge from the source vertex 504 to a third connected vertex 506c.

In addition to utilizing the edge vectors 502a-502c as inputs to the neural network for the vertex step 302 and the edge step 304, FIG. 6B illustrates that the mesh subdivision system 102 also uses per-vertex feature vectors for the vertices 504, 506a-506c as inputs to the neural network for the vertex step 302 and the edge step 304. In particular, in one or more embodiments, the per-vertex feature vectors can be feature vectors produced during the initialization step 300 in preparation for a first subdivision iteration. Alternatively, the per-vertex feature vectors can be feature vectors from a previous subdivision iteration.

As mentioned, FIG. 7A illustrates outputs of the initialization step 300 and the vertex step 302 of FIG. 3. As illustrated, the neural networks (collectively illustrated as neural network 700) for the initialization step 300 and the vertex step 302 process a half-flap 702. The neural network 700 outputs a displacement vector 704 corresponding to a source vertex 706 and a feature vector 708 learned from the half-flap 702. More specifically, the mesh subdivision system 102 can store the learned feature vector 708 at the source vertex 706. Furthermore, the mesh subdivision system 102 can apply the displacement vector 704 to the source vertex 706 to obtain a displaced vertex 710. Thus, the initialization step 300 and the vertex step 302 result in displacement (if any) of existing vertices from the previous level of the three-dimensional mesh.

Additionally, FIG. 7B illustrates outputs of the edge step 304 of FIG. 3. In particular, FIG. 7B illustrates that the neural network 712 for the edge step 304 processes the half-flap 702. The neural network 712 outputs a displacement vector 714 corresponding to a new vertex 716 added to an edge (e.g., to the midpoint of the edge) and a feature vector 718 learned from the half-flap 702 according to the edge. In particular, the mesh subdivision system 102 can store the learned feature vector 718 at the new vertex 716. Additionally, the mesh subdivision system 102 can apply the displacement vector 714 to the new vertex 716 to obtain a displaced new vertex 720. Accordingly, the edge step 304 results in displacement (if any) of new vertices added to edges between existing vertices during subdivision of the three-dimensional mesh.

In connection with subdividing the three-dimensional mesh, the mesh subdivision system 102 can determine vertex coordinates (e.g., coordinates for existing vertices from the previous subdivision level and coordinates for new vertices added during subdivision) according to the global/environment axes. For example, after each subdivision iteration in the mesh subdivision process, the mesh subdivision system 102 can estimate the global coordinates for each vertex in the mesh by converting the coordinates for each local neighborhood of the vertices in the three-dimensional mesh from the respective local coordinate frames to the global coordinate frame. Specifically, after a given subdivision iteration, the mesh subdivision system 102 can combine the results of processing each local neighborhood of the three-dimensional mesh to generate a complete subdivided three-dimensional mesh. In connection with combining the results of processing each local neighborhood, the mesh subdivision system 102 can also convert each coordinate determined relative to a local axes of each half-flap within each one-ring neighborhood of the vertices in the three-dimensional mesh into coordinates of the global axes of the three-dimensional mesh. This can allow the mesh subdivision system 102 to visualize intermediate levels of subdivision, which can also assist in determining loss functions when learning or updating parameters of the neural networks. Additionally, the mesh subdivision system 102 can convert global coordinates to local differential per-vertex quantities (according to the local coordinate frames) before each subdivision iteration so that each network only observes translation- and rotation-invariant representations.

In one or more embodiments, by determining translation- and rotation-invariant representations of vertex coordinates during the mesh subdivision process, the mesh subdivision system 102 can prevent rigid transformations applied to the three-dimensional mesh within the environment from altering the local positions of the vertices. Furthermore, incorporating differential coordinates as part of the input features to the corresponding neural networks improves the efficiency of the training process for the neural networks. In particular, the mesh subdivision system 102 can increase convergence of learning parameters of the neural networks by using the differential coordinates according to local coordinate frames of the vertices. Additionally, training based on local half-flaps and invariant representations allow the mesh subdivision system 102 to use simple neural network architectures such as shallow two-layer multi-layer perceptron.

Figure 8:
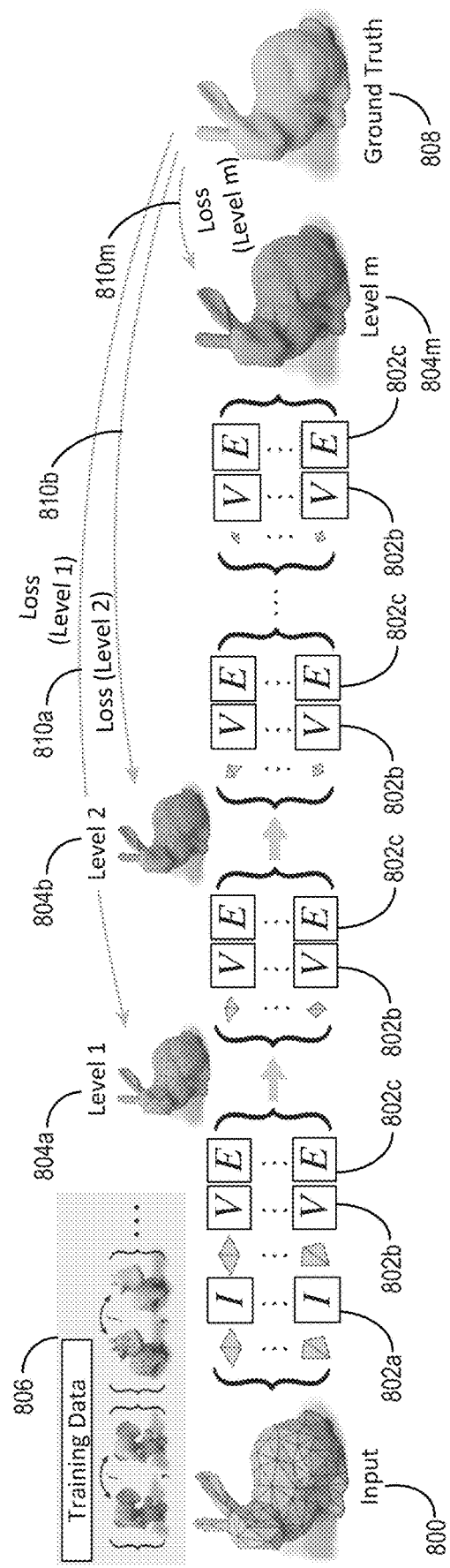
FIG. 8 illustrates a diagram of a process overview for training one or more neural networks to subdivide a three-dimensional mesh in accordance with one or more implementations.

FIG. 8 illustrates an embodiment of a training process for learning parameters of the neural networks involved in the mesh subdivision process. As previously described with respect to FIG. 2A, the mesh subdivision system 102 can utilize the neural networks to perform m subdivision iterations on a coarse three-dimensional mesh 800 using a plurality of neural networks including an initialization neural network 802a, a vertex neural network 802b, and an edge neural network 802c. FIG. 8 illustrates that the mesh subdivision system 102 can further train the separate neural networks by learning parameters of the neural networks based on the m subdivision iterations.

In one or more embodiments, to learn the parameters of the neural networks, the mesh subdivision system 102 utilizes the neural networks to recursively refine the coarse three-dimensional mesh 800. In particular, as previously mentioned, the mesh subdivision system 102 can utilize the initialization neural network 802a, the vertex neural network 802b, and the edge neural network 802c to perform a first subdivision iteration to generate a first subdivided three-dimensional mesh 804a. For each subsequent subdivision iteration, the mesh subdivision system 102 can utilize the vertex neural network 802b and the edge neural network 802c to generate a second subdivided three-dimensional mesh 804b, etc., until generating a level m subdivided three-dimensional mesh 804m.

In one or more embodiments, the mesh subdivision system 102 selects the coarse three-dimensional mesh 800 from a training dataset 806 that includes pairs of coarse and fine (e.g., high-resolution/subdivided) versions of three-dimensional meshes. Specifically, the mesh subdivision system 102 can utilize the coarse versions from the training dataset 806 as the inputs to the neural networks. Additionally, the mesh subdivision system 102 can utilize the fine versions from the training dataset 806 as ground truth meshes.

Furthermore, in one or more embodiments, the training dataset 806 includes a mapping f (e.g., a bijective mapping) between vertices in the coarse and fine versions of the three-dimensional meshes.

When training the neural networks, the mesh subdivision system 102 compares a ground truth three-dimensional mesh 808 (e.g., a fine mesh from the training dataset 806 corresponding to the coarse mesh from the training dataset 806) to each subdivided mesh after each subdivision iteration. For example, the mesh subdivision system 102 can compare the ground truth three-dimensional mesh 808 to the first subdivided three-dimensional mesh 804a to obtain a first loss 810a. In one or more embodiments, the mesh subdivision system 102 determines the first loss 810 as a simple $\ell^2$ loss by measuring the distance between each determined vertex position in the first subdivided three-dimensional mesh 804a and the corresponding vertex on the ground truth three-dimensional mesh 808 according to the bijective mapping. The mesh subdivision system 102 can accordingly determine a second loss 810b by comparing the ground truth three-dimensional mesh 808 to the second subdivided three-dimensional mesh 804b, etc., and an m-level loss 810m by comparing the ground truth three-dimensional mesh 808 to the level m subdivided three-dimensional mesh 804m.

Once the mesh subdivision system 102 has determined losses associated with each of the subdivision iterations, the mesh subdivision system 102 can use the losses to learn parameters of the neural networks. To illustrate, the mesh subdivision system 102 can utilize back propagation based on the losses across the separate subdivided iterations to update/learn the parameters of the initialization neural network 802a, the vertex neural network 802b, and the edge neural network 802c. In one or more embodiments, the mesh subdivision system 102 can iterate over a plurality of coarse/fine pairs of three-dimensional meshes from the training dataset 806 to further optimize the parameters. While the mesh subdivision system 102 can provide more accurate neural networks while training on a plurality of coarse/fine pairs of three-dimensional meshes, the mesh subdivision system 102 can also provide accurate neural networks by training on a single coarse/fine pair of three-dimensional meshes due to subdividing based on local coordinate frames and using the $\ell^2$ loss.

In one or more embodiments, the mesh subdivision system 102 can generate the pairs of coarse meshes and fine meshes. More specifically, in one or more embodiments, the mesh subdivision system 102 can generate the bijective mapping f between the coarse level mesh and the fine level mesh. Specifically, in one or more embodiments, the can utilize the techniques described in U.S. patent application Ser. No. 16/863,099, the contents of which are hereby incorporated by reference in their entirety.

Figure 9A:
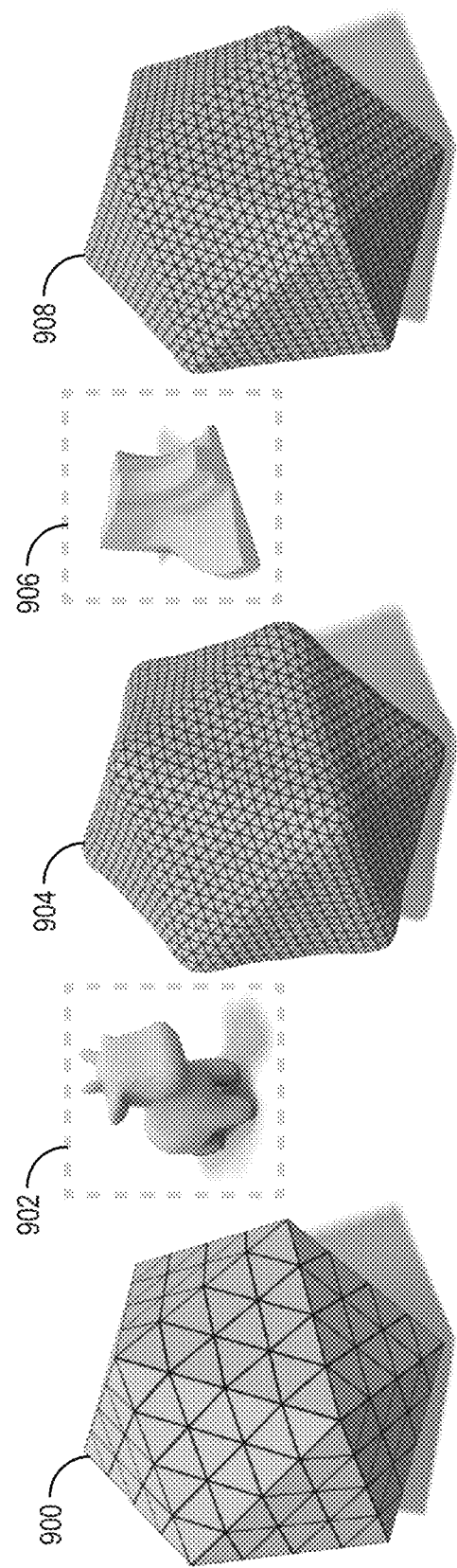
FIG. 9A illustrates a diagram of a process for applying different effects to a coarse three-dimensional mesh based on different training meshes in accordance with one or more implementations.

Furthermore, FIG. 9A illustrates that the mesh subdivision system 102 can customize the mesh subdivision process to produce subdivided meshes with different stylistic effects based on the training data. Specifically, FIG. 9A illustrates that the mesh subdivision system 102 can subdivide a coarse three-dimensional mesh 900 using neural networks, as described previously. The mesh subdivision system 102 can train the neural networks using a first mesh 902 with a first shape to create a first subdivided mesh 904. Additionally, the mesh subdivision system 102 can train the neural networks using a second mesh 906 with a second shape to create a second subdivided mesh 908.

As illustrated in FIG. 9A, the first subdivided mesh 904 has a different shape than the second subdivided mesh 908 due to the different shapes of the first mesh 902 and the second mesh 906. For instance, by training the neural networks using a mesh with a rounded shape (e.g., the first mesh 902), the mesh subdivision system 102 can output subdivided meshes that have rounded shapes (e.g., the first subdivided mesh 904). Alternatively, by training the neural networks using a mesh with sharp creases (e.g., the second mesh 906), the mesh subdivision system 102 can output subdivided meshes that have sharp creases (e.g., the second subdivided mesh 908). The mesh subdivision system 102 can similarly produce additional stylistic effects to the same coarse geometry by using differently styled training meshes.

In one or more embodiments, the flexibility in the outputs of subdivided meshes can allow the mesh subdivision system 102 to provide a variety of tools to users. For instance, the mesh subdivision system 102 can train a plurality of different versions of the neural networks using different training datasets that result in the different versions of the neural networks outputting subdivided meshes with different stylistic effects. The mesh subdivision system 102 can then provide, for display within a user interface of a client application, a plurality of selectable tools for applying each of the different neural networks to an input mesh (e.g., a mesh created by the user). In response to receiving a request to apply a particular neural network to the input mesh in a selected number of subdivision iterations, the mesh subdivision system 102 can apply the corresponding neural network to the input mesh and generate a subdivided mesh having the selected number of subdivisions.

Figure 9B:
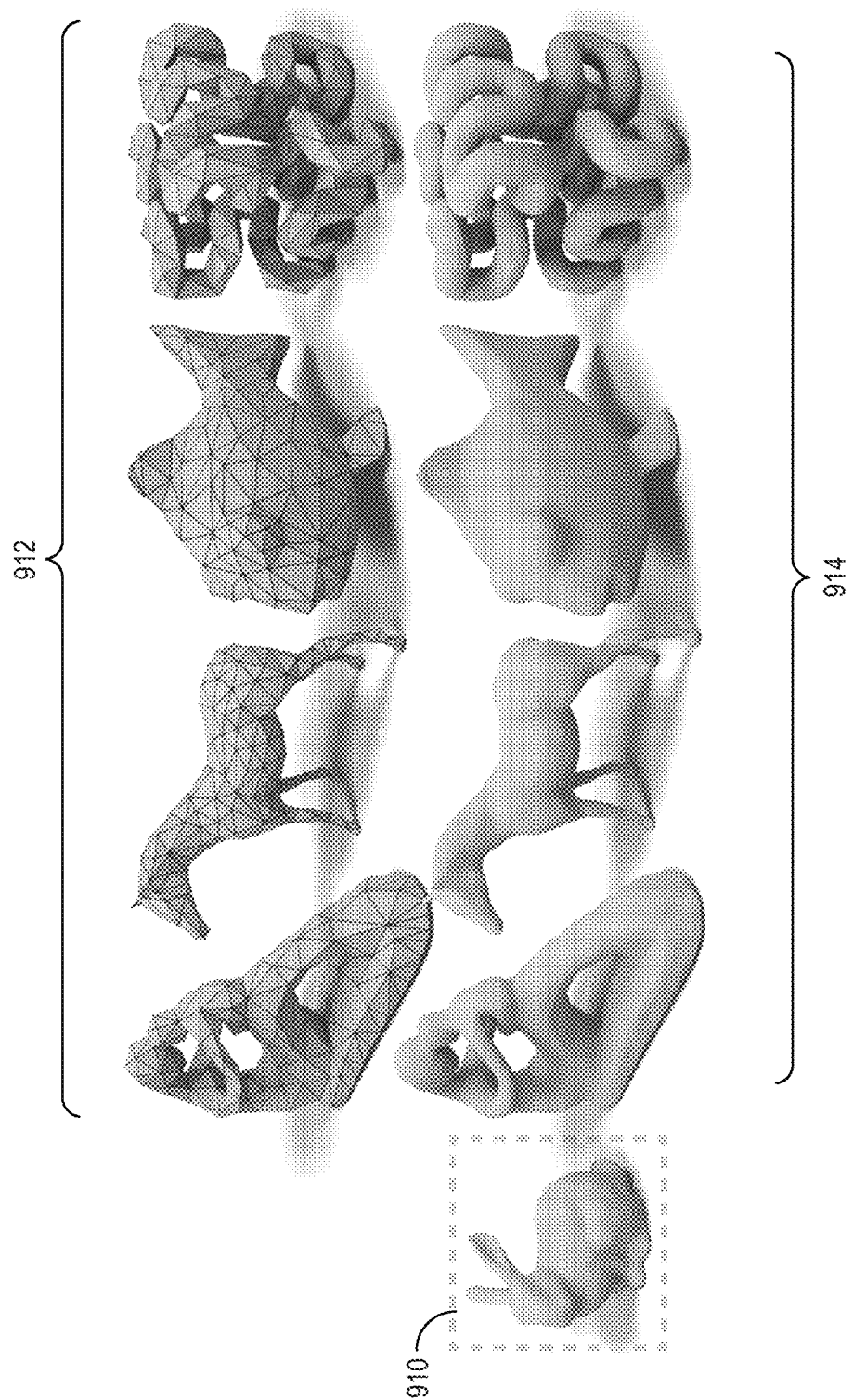
FIG. 9B illustrates a diagram indicating neural subdivision utilizing a neural network trained on a single mesh in accordance with one or more implementations.

FIG. 9B illustrates that the mesh subdivision system 102 can also provide efficiency and accuracy by providing accurate subdivision while reducing the amount of training data needed to train the neural network over conventional systems. In particular, FIG. 9B illustrates that the mesh subdivision system 102 can utilize a single shape 910 to learn parameters of the neural network. The mesh subdivision system 102 can then use the neural network trained on the single shape 910 to successively subdivide a plurality of coarse three-dimensional meshes 912 to generate a plurality of subdivided three-dimensional meshes 914 having varied shapes and classes. As shown in FIG. 9B, the results of training on the single shape 910 produce highly accurate results that are able to retain and highlight local geometries of the underlying shapes in the plurality of subdivided three-dimensional meshes 914. The mesh subdivision system 102 can thus provide a robust neural network that can be generalized across a plurality of different shapes and classes.

Furthermore, as illustrated in the table below, the mesh subdivision system 102 provides accurate subdivision of three-dimensional shapes relative to conventional systems. Specifically, the table below compares the results of the mesh subdivision system 102 ("system" in Table 1, with the neural network trained on a single category, "Centaur") with the results of methods described in "Smooth subdivision surfaces based on triangles" by Charles Loop in Master's thesis, University of Utah, Department of Mathematics (1987) ("loop" in Table 1) and in "Interpolating subdivision for meshes with arbitrary topology" by Denis Zorin, Peter Schröder, and Wim Sweldens in SIGGRAPH, 1996 ("m.b." in Table 1). More specifically, Table 1 indicates the results with respect to Hausdorff distance $\mathbb{H}$ and the mean surface distance $\mathbb{M}$ via "Metro: measuring error on simplified surfaces" by Paolo Cignoni, Claudio Rocchini, and Roberto Scopigno in Computer graphics forum, Vol. 17, Wiley Online Library, 167-174, 1998.

| Category | $\mathbb{H}_{loop}$ | $\mathbb{H}_{m.b.}$ | $\mathbb{H}_{system}$ | $\mathbb{M}_{loop}$ | $\mathbb{M}_{m.b.}$ | $\mathbb{M}_{system}$ |
|---|---|---|---|---|---|---|
| Cat | 2.75 | 2.17 | 2.08 | 0.73 | 0.21 | 0.17 |
| David | 2.95 | 2.13 | 1.83 | 0.88 | 0.27 | 0.20 |
| Dog | 3.26 | 2.32 | 2.11 | 0.84 | 0.31 | 0.26 |
| Gorilla | 4.53 | 3.17 | 2.56 | 1.27 | 0.48 | 0.36 |
| Horse | 5.87 | 4.53 | 4.04 | 1.51 | 0.50 | 0.45 |
| Michael | 3.88 | 2.71 | 2.24 | 1.12 | 0.38 | 0.28 |
| Victoria | 4.25 | 3.01 | 2.36 | 1.12 | 0.39 | 0.30 |
| Wolf | 2.83 | 1.74 | 1.63 | 0.69 | 0.23 | 0.21 |

As illustrated in Table 1 above, the mesh subdivision system 102 outperforms the "loop" subdivision and "m.b." subdivision in both metrics while training the neural network of the mesh subdivision system 102 on a single shape. Table 2 below illustrates results when training the neural network of the mesh subdivision system 102 on three categories (Centaur, David, Horse). Table 2 illustrates that the mesh subdivision system 102 also outperforms the conventional systems when training the neural network on the three different categories.

| Category | $\mathbb{H}_{loop}$ | $\mathbb{H}_{m.b.}$ | $\mathbb{H}_{system}$ | $\mathbb{M}_{loop}$ | $\mathbb{M}_{m.b.}$ | $\mathbb{M}_{system}$ |
|---|---|---|---|---|---|---|
| Cat | 2.75 | 2.17 | 2.09 | 0.73 | 0.21 | 0.16 |
| Dog | 3.26 | 2.32 | 2.12 | 0.84 | 0.31 | 0.25 |
| Gorilla | 4.53 | 3.17 | 2.89 | 1.27 | 0.48 | 0.34 |
| Michael | 3.88 | 2.71 | 2.15 | 1.12 | 0.38 | 0.27 |
| Victoria | 4.25 | 3.01 | 2.49 | 1.12 | 0.39 | 0.28 |
| Wolf | 2.83 | 1.74 | 1.65 | 0.69 | 0.23 | 0.20 |

As described in relation to FIGS. 2, 3, 4, 5A-5B, 6A-6B, and 7A-7B, the mesh subdivision system 102 can perform operations for utilizing at least one neural network to subdivide a three-dimensional mesh according to local geometries of vertices in the three-dimensional mesh. The operations allow the mesh subdivision system 102 to accurately subdivide a three-dimensional mesh while retaining detail in the three-dimensional mesh. Accordingly, the acts and operations illustrated and described above in relation to FIGS. 2, 3, 4, 5A-5B, 6A-6B, and 7A-7B can provide the corresponding acts (e.g., structure) for a step for utilizing a neural network to generate a subdivided three-dimensional mesh based on the local geometries of the plurality of existing vertices in the three-dimensional mesh.

Figure 10:
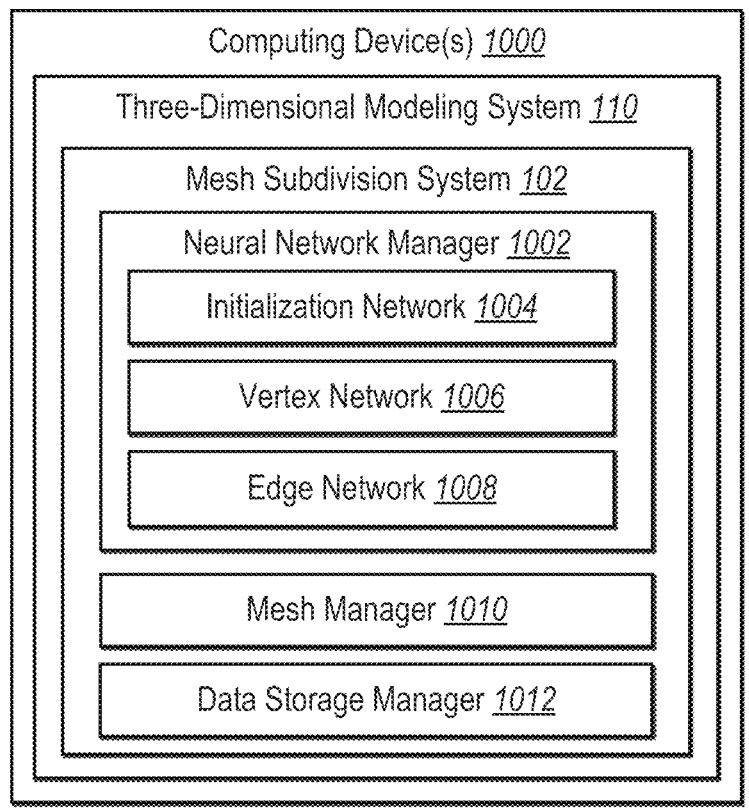
FIG. 10 illustrates a diagram of one embodiment of an architecture for the mesh subdivision system of FIG. 1 in accordance with one or more implementations.

FIG. 10 illustrates a detailed schematic diagram of an embodiment of the mesh subdivision system 102 described above. As shown, the mesh subdivision system 102 can be implemented in a three-dimensional modeling system 110 on computing device(s) 1000 (e.g., a client device and/or server device as described in FIG. 1, and as further described below in relation to FIG. 12). Additionally, the mesh subdivision system 102 can include, but is not limited to, a neural network manager 1002 (including an initialization network 1004, a vertex network 1006, and an edge network 1008), a mesh manager 1010, and a data storage manager 1012. The mesh subdivision system 102 can be implemented on any number of computing devices. For example, the mesh subdivision system 102 can be implemented in a distributed system of server devices for subdividing and rendering three-dimensional meshes. The mesh subdivision system 102 can also be implemented within one or more additional systems. Alternatively, the mesh subdivision system 102 can be implemented on a single computing device such as a single client device.

In one or more embodiments, each of the components of the mesh subdivision system 102 is in communication with other components using any suitable communication technologies. Additionally, the components of the mesh subdivision system 102 can be in communication with one or more other devices including other computing devices of a user, server devices (e.g., cloud storage devices), licensing servers, or other devices/systems. It will be recognized that although the components of the mesh subdivision system 102 are shown to be separate in FIG. 10, any of the subcomponents may be combined into fewer components, such as into a single component, or divided into more components as may serve a particular implementation. Furthermore, although the components of FIG. 10 are described in connection with the mesh subdivision system 102, at least some of the components for performing operations in conjunction with the mesh subdivision system 102 described herein may be implemented on other devices within the environment.

The components of the mesh subdivision system 102 can include software, hardware, or both. For example, the components of the mesh subdivision system 102 can include one or more instructions stored on a computer-readable storage medium and executable by processors of one or more computing devices (e.g., the computing device(s) 1000). When executed by the one or more processors, the computer-executable instructions of the mesh subdivision system 102 can cause the computing device(s) 1000 to perform the mesh subdivision operations described herein. Alternatively, the components of the mesh subdivision system 102 can include hardware, such as a special purpose processing device to perform a certain function or group of functions. Additionally, or alternatively, the components of the mesh subdivision system 102 can include a combination of computer-executable instructions and hardware.

Furthermore, the components of the mesh subdivision system 102 performing the functions described herein with respect to the mesh subdivision system 102 may, for example, be implemented as part of a stand-alone application, as a module of an application, as a plug-in for applications, as a library function or functions that may be called by other applications, and/or as a cloud-computing model. Thus, the components of the mesh subdivision system 102 may be implemented as part of a stand-alone application on a personal computing device or a mobile device. Alternatively, or additionally, the components of the mesh subdivision system 102 may be implemented in any application that provides three-dimensional image rendering, including, but not limited to ADOBE® AERO®, SUBSTANCE STRUCTURE or SUBSTANCE PAINTER® software.

As described above, the mesh subdivision system 102 can include a neural network manager 1002 to facilitate the utilization of one or more neural networks in a mesh subdivision process. For example, the neural network manager 1002 can facilitate the training of neural networks (e.g., learning parameters of the neural networks) via the use of training data. The neural network manager 1002 can use coarse and fine three-dimensional mesh pairs to determine losses corresponding to each subdivision iteration and then update the parameters of the neural networks based on the losses.

Furthermore, the neural network manager 1002 can utilize neural networks to perform one or more steps in one or more subdivision iterations. To illustrate, the neural network manager 1002 can utilize an initialization network 1004 to perform an initialization step in a mesh subdivision process by determining local coordinate frames for vertices in a three-dimensional mesh. The neural network manager 1002 can also utilize a vertex network 1006 to determine displacement coordinates for existing vertices in the three-dimensional mesh. The neural network manager 1002 can further utilize an edge network 1008 to determine coordinates for new vertices added to edges between existing vertices in the three-dimensional mesh. Additionally, in one or more embodiments, one or more of the initialization network 1004, the vertex network 1006, or the edge network 1008 may be a multi-layer perceptron.

The neural network manager 1002 can also include a mesh manager 1010 to facilitate the management of three-dimensional meshes in a mesh subdivision process. For example, the mesh manager 1010 can identify a three-dimensional mesh for a subdivision process. The mesh manager 1010 can also manage levels of subdivided three-dimensional meshes (e.g., identifying and storing a mesh after each subdivision iteration in connection with the data storage manager 1012). Furthermore, the mesh manager 1010 can manage a training dataset of coarse/fine mesh pairs for training neural networks in connection with the neural network manager 1002.

Additionally, the mesh subdivision system 102 also includes a data storage manager 1012 (that comprises a non-transitory computer memory/one or more memory devices) that stores and maintains data associated with subdividing three-dimensional meshes. For example, the data storage manager 1012 can store one or more neural networks (e.g., the initialization network 1004, the vertex network 1006, and the edge network 1008). The data storage manager 1012 can also store information associated with three-dimensional meshes such as vertex coordinates.

Figure 11:
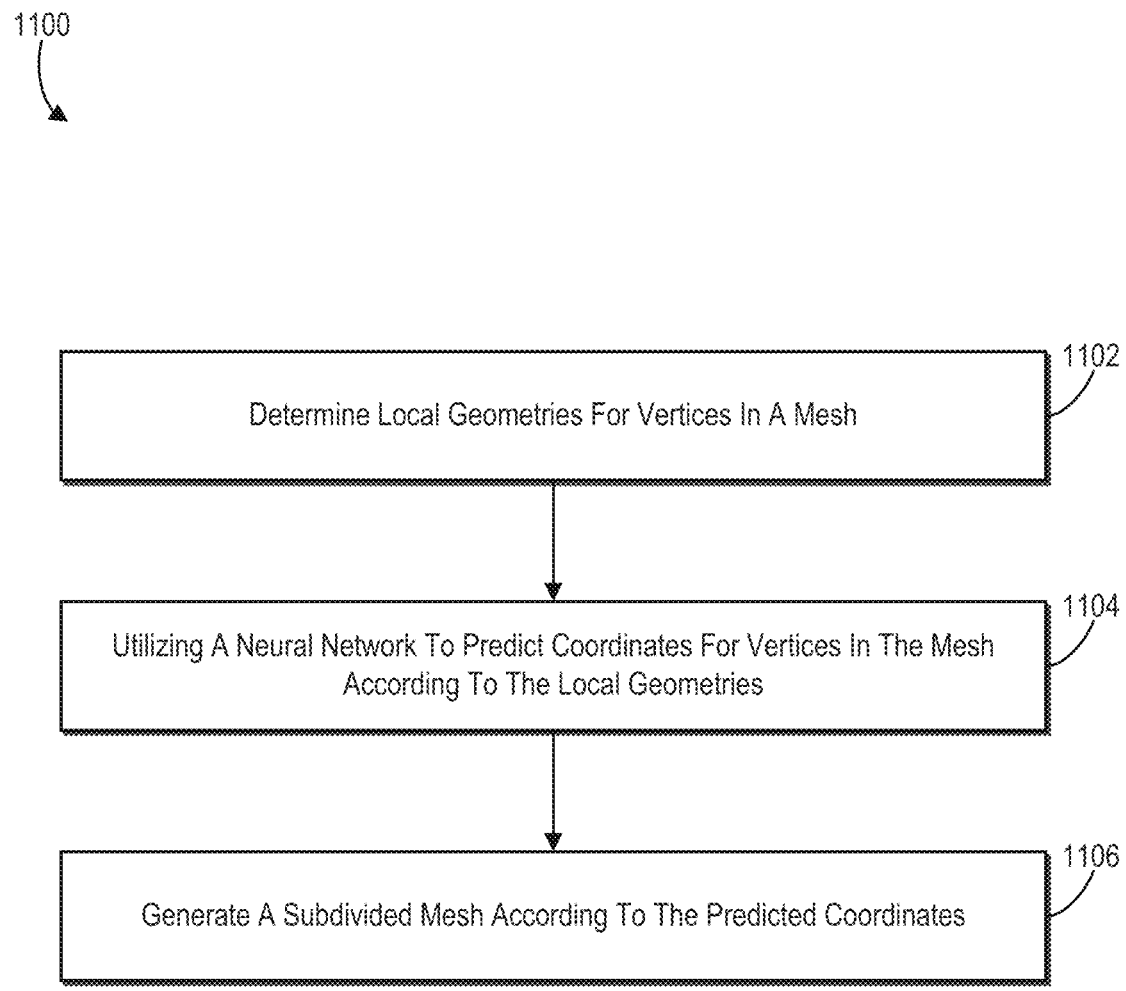
FIG. 11 illustrates a flowchart of a series of acts for utilizing one or more neural networks to subdivide a three-dimensional mesh in accordance with one or more implementations.

Turning now to FIG. 11, this figure shows a flowchart of a series of acts 1100 of performing mesh subdivision utilizing a neural network according to local geometries. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11.

As shown, the series of acts 1100 includes an act 1102 of determining local geometries for vertices in a mesh. For example, act 1102 involves determining a local geometry for each vertex of a plurality of existing vertices in a three-dimensional mesh. For example, the three-dimensional mesh can include a three-dimensional triangle mesh comprising a plurality of triangular faces formed by the plurality of existing vertices. Act 1102 can involve identifying, for a vertex, a one-ring neighborhood of vertices connected to the vertex via a plurality of edges. Act 1102 can further involve determining a plurality of half-flaps corresponding to the vertex within the one-ring neighborhood according to a plurality of directed edges from the vertex, wherein each half flap comprises a pair of adjacent triangular faces sharing a directed edge from the vertex.

The series of acts 1100 also includes an act 1104 of utilizing a neural network to determine coordinates for vertices in the mesh according to the local geometries. For example, act 1104 involves subdividing, utilizing at least one neural network, the three-dimensional mesh by processing the local geometry for each vertex to determine displacement coordinates for the plurality of existing vertices and coordinates for new vertices added to edges between the plurality of existing vertices. In one or more embodiments, the at least one neural network comprises one or more multi-layer perceptrons.

Act 1104 can involve generating, utilizing the at least one neural network, a plurality of feature vectors representing the plurality of half-flaps within the one-ring neighborhood. Act 1104 can then involve generating a feature vector representing per-vertex features of the one-ring neighborhood by utilizing average pooling to combine the plurality of feature vectors representing the plurality of half-flaps. For example, act 1104 can involve utilizing a neural network to generate the plurality of feature vectors representing the plurality of half-flaps.

Act 1104 can also involve determining, utilizing the at least one neural network, the displacement coordinates for the plurality of existing vertices by determining feature vectors for the plurality of existing vertices based on the local geometries of the plurality of existing vertices. For example, act 1104 can involve utilizing a neural network to determine the displacement coordinates for the plurality of existing vertices.

Additionally, act 1104 can involve determining, utilizing the at least one neural network, the coordinates for new vertices added to the edges between the plurality of existing vertices by determining feature vectors for the new vertices based on the local geometries of the plurality of existing vertices. For example, act 1104 can involve utilizing a neural network to determine the coordinates for the new vertices. More specifically, act 1104 can involve generating, utilizing the at least one neural network, a plurality of feature vectors for a new vertex added to an edge by generating a first feature vector for a first half-flap corresponding to a first direction of the edge and a second feature vector for a second half-flap corresponding to a second direction of the edge. Act 1104 can then involve generating a feature vector representing the new vertex by utilizing average pooling to combine the first feature vector and the second feature vector.

Act 1104 can further involve determining a local coordinate frame for an existing vertex in the three-dimensional mesh, wherein the local coordinate frame is different from a global coordinate frame for the three-dimensional mesh. For example, act 1106 can involve determining the local coordinate frame for the existing vertex by determining an x-axis within the local coordinate frame from a half-edge direction in a half-flap for the existing vertex, a z-axis within the local coordinate frame from an averaged normal of adjacent faces in the half-flap for the existing vertex, and a y-axis within the local coordinate frame from a cross product of the x-axis and the z-axis. Act 1106 can also involve determining a plurality of differential per-vertex quantities according to the local coordinate frame for an existing vertex in the three-dimensional mesh, wherein the differential per-vertex quantities represent vertices within a local geometry of the existing vertex.

Additionally, act 1104 can involve recursively subdividing, utilizing the at least one neural network, the three-dimensional mesh to generate a plurality of levels of subdivided three-dimensional meshes. Act 1104 can then involve determining, for each level of subdivided three-dimensional meshes of the plurality of levels of subdivided three-dimensional meshes, an $\ell^2$ loss by comparing the level of subdivided three-dimensional mesh to a ground truth three-dimensional mesh corresponding to the three-dimensional mesh. Act 1104 can also involve learning parameters of the a least one neural network using the $\ell^2$ losses corresponding to the plurality of levels of subdivided three-dimensional meshes.

Additionally, the series of acts 1100 includes an act 1106 of generating a subdivided mesh according to the determined coordinates. For example, act 1106 involves generating a subdivided three-dimensional mesh according to the displacement coordinates for the plurality of existing vertices and the coordinates for the new vertices added to edges between the plurality of existing vertices. Act 1106 can involve generating the subdivided three-dimensional mesh by combining the plurality of existing vertices and the new vertices according to the displacement coordinates for the plurality of existing vertices and the coordinates for the new vertices relative to global axes associated with the three-dimensional mesh. For example, act 1106 can involve converting the displacement coordinates for the plurality of existing vertices and the coordinates for the new vertices from local coordinate frames corresponding to local geometries of the plurality of existing vertices to global coordinates relative to the global axes associated with the three-dimensional mesh.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
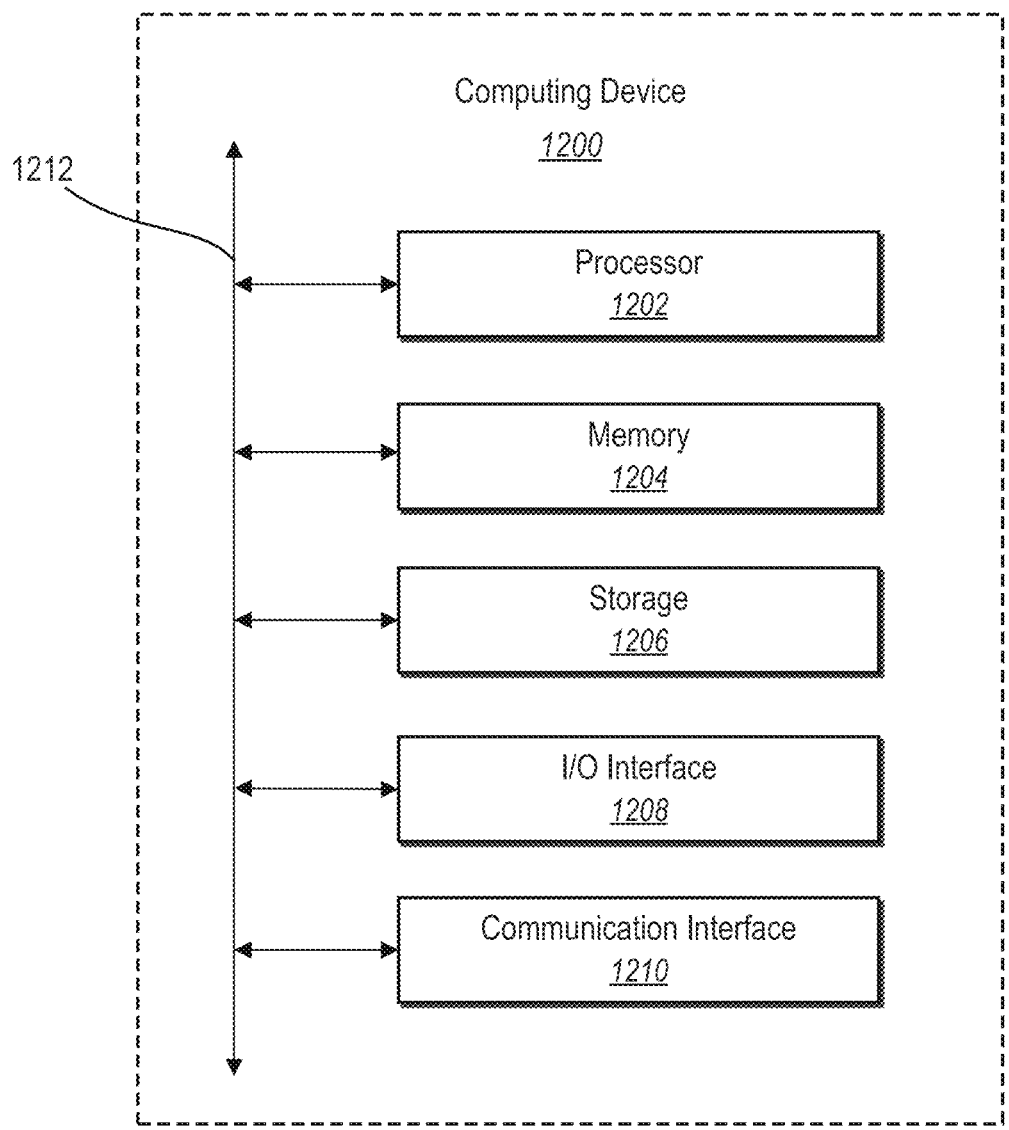
FIG. 12 illustrates a block diagram of an exemplary computing device in accordance with one or more embodiments.

FIG. 12 illustrates a block diagram of exemplary computing device 1200 that may be configured to perform one or more of the processes described above. One will appreciate that one or more computing devices such as the computing device 1200 may implement the system(s) of FIG. 1. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for dynamically modifying workflows, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions for performing the methods described herein.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example, and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
   determining local geometries comprising adjacent vertices of existing vertices in a three-dimensional mesh;
   generating, utilizing at least one neural network, a set of displacement coordinates displacing a subset of the existing vertices from initial positions of the subset of the existing vertices in the three-dimensional mesh to new positions and a set of new coordinates for new vertices along edges connecting the existing vertices by causing the at least one neural network to generate the set of displacement coordinates and the set of new coordinates from feature vectors of the local geometries;
   generating a subdivided three-dimensional mesh comprising vertices at positions according to the set of displacement coordinates for the existing vertices and the set of new coordinates for the new vertices along the edges connecting the existing vertices; and
   recursively subdividing the three-dimensional mesh to generate a plurality of levels of subdivided three-dimensional meshes according to the set of displacement coordinates for the existing vertices and the set of new coordinates for the new vertices generated utilizing the at least one neural network.

2. The computer-implemented method of claim 1, further comprising generating the feature vectors of the local geometries by generating, for a particular vertex of the three-dimensional mesh, a feature vector of a local geometry based on a set of features of a one-ring neighborhood of vertices adjacent to the particular vertex.

3. The computer-implemented method of claim 2, wherein:
   generating the set of displacement coordinates and the set of new coordinates comprises generating, utilizing the at least one neural network, a displacement coordinate for the particular vertex based on the feature vector of the local geometry; and
   generating the subdivided three-dimensional mesh comprises generating the subdivided three-dimensional mesh including the particular vertex at an updated position based on the displacement coordinate generated by the at least one neural network.

4. The computer-implemented method of claim 2, wherein:
   generating the set of displacement coordinates and the set of new coordinates comprises generating, utilizing the at least one neural network, a new coordinate for a new vertex along an edge within the one-ring neighborhood of the vertices adjacent to the particular vertex; and
   generating the subdivided three-dimensional mesh comprises generating the subdivided three-dimensional mesh including the new vertex along the edge within the one-ring neighborhood at a new position based on the new coordinate generated utilizing the at least one neural network.

5. The computer-implemented method of claim 2, wherein generating the feature vectors comprises:
   generating the set of features representing triangles formed by edges and vertices within the one-ring neighborhood of the vertices adjacent to the particular vertex; and
   generating the feature vector of the particular vertex by combining the set of features.

6. The computer-implemented method of claim 2, wherein generating the set of displacement coordinates and the set of new coordinates comprises generating, utilizing the at least one neural network, the set of displacement coordinates and the set of new coordinates based on a plurality of edge vectors representing edges within the one-ring neighborhood of the vertices adjacent to the particular vertex.

7. The computer-implemented method of claim 1, wherein generating the set of displacement coordinates and the set of new coordinates comprises:
   generating, utilizing a first neural network, the set of displacement coordinates for the existing vertices of the three-dimensional mesh; and
   generating, utilizing a second neural network, the set of new coordinates for the new vertices along the edges connecting the existing vertices.

8. The computer-implemented method of claim 7, further comprising:
   iteratively generating, for a plurality of subdivision iterations, displacement coordinates for existing vertices utilizing the first neural network and new coordinates for new vertices utilizing the second neural network; and
   generating a final subdivided three-dimensional mesh comprising a plurality of displaced vertices and new vertices based on the plurality of subdivision iterations.

9. The computer-implemented method of claim 7, wherein generating the set of new coordinates comprises:
   generating, utilizing the second neural network, a new feature vector corresponding to a new vertex along an edge within a local geometry of a particular vertex of the existing vertices, the new feature vector learned from a feature vector corresponding to the local geometry of the particular vertex; and
   storing the new feature vector in connection with the new vertex.

10. A system comprising:
   a memory component; and
   a processing device coupled to the memory component, the processing device to perform operations comprising:
      determining per-vertex feature vectors of existing vertices in a three-dimensional mesh based on a plurality of local geometries comprising adjacent vertices of the existing vertices;
      generating, utilizing a first neural network, a set of displacement coordinates to displace a subset of the existing vertices from initial positions of the subset of the existing vertices to new positions for the subset of the existing vertices by causing the first neural network to generate the set of displacement coordinates from the per-vertex feature vectors of the existing vertices;
      generating, utilizing a second neural network, a set of new coordinates for new vertices along edges connecting the existing vertices by causing the second neural network to generate feature vectors for the new vertices based on the per-vertex feature vectors of the existing vertices;
      generating a subdivided three-dimensional mesh comprising vertices at positions according to the set of displacement coordinates displacing the subset of the existing vertices and the set of new coordinates for the new vertices added to the edges connecting the existing vertices; and
      recursively subdividing the three-dimensional mesh to generate a plurality of levels of subdivided three-dimensional meshes according to displacement coordinates for existing vertices generated utilizing the first neural network and new coordinates for new vertices generated utilizing the second neural network.

11. The system of claim 10, wherein determining the per-vertex feature vectors of the existing vertices comprises generating a per-vertex feature vector for a particular vertex of the existing vertices of the three-dimensional mesh based on features representing combinations of vertices and edges within a one-ring neighborhood of the particular vertex.

12. The system of claim 11, wherein generating the set of displacement coordinates comprises generating a displacement coordinate for the particular vertex by utilizing the first neural network based on the per-vertex feature vector of the particular vertex to determine an updated position of the particular vertex relative to an initial position of the particular vertex.

13. The system of claim 12, wherein generating the set of new coordinates comprises:
   determining a new vertex to add to an edge connected to the particular vertex within the one-ring neighborhood of the particular vertex in connection with the updated position of the particular vertex; and
   generating a new coordinate for the new vertex by utilizing the second neural network based on the per-vertex feature vector of the particular vertex to determine a position of the new vertex.

14. The system of claim 13, wherein generating the subdivided three-dimensional mesh comprises generating the subdivided three-dimensional mesh to include the particular vertex placed at the displacement coordinate and the new vertex placed at the new coordinate.

15. The system of claim 10, wherein recursively subdividing the three-dimensional mesh comprises generating updated displacement coordinates for existing vertices and new coordinates for new vertices at each level of the plurality of levels of subdivided three-dimensional meshes.

16. The system of claim 10, the operations further comprising:
   determining, for a level of subdivided three-dimensional mesh of the plurality of levels of subdivided three-dimensional meshes, a loss by comparing the level of subdivided three-dimensional mesh to a ground truth three-dimensional mesh corresponding to the three-dimensional mesh; and
   learning parameters of the first neural network and the second neural network using the loss corresponding to level of subdivided three-dimensional mesh.

17. A non-transitory computer readable medium storing executable instructions, which when executed by a processing device, cause the processing device to perform operations comprising:
   determining local geometries comprising adjacent vertices of existing vertices in a three-dimensional mesh;
   generating, utilizing a plurality of neural networks, a set of displacement coordinates displacing a subset of the existing vertices from initial positions of the subset of the existing vertices in the three-dimensional mesh to new positions and a set of new coordinates for new vertices along edges connecting the existing vertices by causing the plurality of neural networks to generate the set of displacement coordinates and the set of new coordinates from feature vectors of the local geometries;
   generating a subdivided three-dimensional mesh comprising vertices positioned according to the set of displacement coordinates for the existing vertices and the set of new coordinates for the new vertices added to the edges connecting the existing vertices; and
   recursively subdividing the three-dimensional mesh to generate a plurality of levels of subdivided three-dimensional meshes according to the set of displacement coordinates for the existing vertices and the set of new coordinates for the new vertices generated utilizing the plurality of neural networks.

18. The non-transitory computer readable medium of claim 17, wherein determining the local geometries comprises generating, for a particular vertex of the existing vertices, a feature vector of a local geometry based on a set of features representing vertices and edges in a one-ring neighborhood of the particular vertex.

19. The non-transitory computer readable medium of claim 18, wherein generating the set of displacement coordinates and the set of new coordinates comprises:
   generating, utilizing a first neural network, a displacement coordinate for the particular vertex based on the feature vector of the local geometry of the particular vertex; and
   generating, utilizing a second neural network, a new coordinate for a new vertex added to an edge in the one-ring neighborhood of the particular vertex in connection with the displacement coordinate of the particular vertex.

20. The non-transitory computer readable medium of claim 19, wherein generating the subdivided three-dimensional mesh comprises subdividing the three-dimensional mesh to reposition the particular vertex to a position corresponding to the displacement coordinate and add the new vertex to a position corresponding to the new coordinate.

* * * * *